(12) United States Patent
Bhide et al.

(10) Patent No.: US 9,990,265 B2
(45) Date of Patent: *Jun. 5, 2018

(54) DIAGNOSING CAUSES OF PERFORMANCE ISSUES OF VIRTUAL MACHINES

(71) Applicant: SPLUNK INC., San Francisco, CA (US)

(72) Inventors: Alok A. Bhide, Mountain View, CA (US); Poorva Malviya, Emeryville, CA (US); Leonid V. Alekseyev, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/688,040

(22) Filed: Apr. 16, 2015

(65) Prior Publication Data

US 2015/0293830 A1 Oct. 15, 2015

Related U.S. Application Data

(63) Continuation of application No. 14/253,795, filed on Apr. 15, 2014, now Pat. No. 9,052,938.

(51) Int. Cl.
*G06F 9/455* (2018.01)
*G06F 11/32* (2006.01)
(Continued)

(52) U.S. Cl.
CPC ............ *G06F 11/328* (2013.01); *G06F 3/048* (2013.01); *G06F 3/0653* (2013.01);
(Continued)

(58) Field of Classification Search
None
See application file for complete search history.

(56) References Cited

U.S. PATENT DOCUMENTS 8,464,254 B1 * 6/2013 Vohra .................. G06F 11/1458 718/1
8,495,254 B2 * 7/2013 Hashimoto ........... G06F 9/5077 710/10

(Continued)

OTHER PUBLICATIONS

U.S. Appl. No. 14/253,795, filed Apr. 15, 2014, Office Action dated Jun. 27, 2014.

(Continued)

*Primary Examiner* — Mehran Kamran
(74) *Attorney, Agent, or Firm* — Perkins Coie LLP

(57) ABSTRACT

Virtual machine data records are obtained from a virtual system manager that manages one or more virtual machines. Storage data records are obtained from a storage controller. The virtual machine data records include one or more particular virtual machine data records relating to a particular virtual machine and identify a particular volume that is configured for use by the particular virtual machine. The storage data records including one or more particular storage data records that specify performance information associated with the particular volume. Based on information in the particular virtual machine data records and information in the particular storage data records, it is determined that the particular storage data records are related to the particular volume used by the particular virtual machine. Graphical user interface(s) displaying virtual machine information relating to the particular virtual machine in association with volume performance information relating to the particular volume are displayed.

31 Claims, 11 Drawing Sheets

(51) Int. Cl.
  *G06F 9/50* (2006.01)
  *G06F 3/06* (2006.01)
  *G06F 11/34* (2006.01)
  *G06F 3/048* (2013.01)

(52) U.S. Cl.
  CPC ...... *G06F 9/45533* (2013.01); *G06F 9/45558* (2013.01); *G06F 9/5016* (2013.01); *G06F 11/34* (2013.01); *G06F 2009/4557* (2013.01); *G06F 2009/45579* (2013.01)

(56) References Cited

U.S. PATENT DOCUMENTS

| | | | |
|---|---|---|---|
| 9,052,938 B1 | 6/2015 | Bhide et al. | |
| 2003/0154177 A1* | 8/2003 | Holland | G06Q 10/04 706/60 |
| 2008/0141264 A1* | 6/2008 | Johnson | G06F 9/455 718/105 |
| 2008/0208932 A1* | 8/2008 | Tsuge | G06F 11/1458 |
| 2009/0172666 A1* | 7/2009 | Yahalom | G06F 3/0605 718/1 |
| 2009/0282000 A1* | 11/2009 | Bennett | G06F 17/30867 |
| 2010/0115049 A1* | 5/2010 | Matsunaga | G06F 3/0626 709/216 |
| 2010/0275201 A1* | 10/2010 | Lunawat | G06F 9/45537 718/1 |
| 2011/0029739 A1* | 2/2011 | Nakajima | G06F 3/0605 711/154 |
| 2011/0066823 A1* | 3/2011 | Ando | G06F 3/0605 711/171 |
| 2011/0153697 A1* | 6/2011 | Nickolov | G06F 9/4856 707/827 |
| 2011/0231606 A1* | 9/2011 | Kavuri, Sr. | G06F 3/0605 711/114 |
| 2012/0179874 A1* | 7/2012 | Chang | G06F 9/45558 711/128 |
| 2012/0191929 A1* | 7/2012 | Zietzke | G06F 9/45533 711/162 |
| 2012/0266177 A1* | 10/2012 | Kakeda | G06F 3/067 718/104 |
| 2012/0303923 A1* | 11/2012 | Behera | G06F 9/455 711/170 |
| 2013/0042123 A1* | 2/2013 | Smith | G06F 9/5094 713/300 |
| 2013/0117494 A1* | 5/2013 | Hughes | G06F 12/08 711/6 |
| 2013/0159359 A1* | 6/2013 | Kumar | G06F 3/0605 707/822 |
| 2013/0204960 A1* | 8/2013 | Ashok | G06F 15/17 709/213 |
| 2013/0205005 A1* | 8/2013 | Ashok | G06F 15/17 709/224 |
| 2013/0239111 A1 | 9/2013 | Bingham et al. | |
| 2013/0254383 A1* | 9/2013 | Wray | H04L 47/70 709/224 |
| 2013/0311645 A1* | 11/2013 | Nagami | G06F 11/0709 709/224 |
| 2013/0318095 A1* | 11/2013 | Harold | G06F 17/30424 707/741 |
| 2013/0318236 A1 | 11/2013 | Coates et al. | |
| 2013/0318604 A1 | 11/2013 | Coates et al. | |
| 2013/0346615 A1* | 12/2013 | Gondi | G06F 9/5016 709/226 |
| 2014/0019972 A1* | 1/2014 | Yahalom | H04L 67/1097 718/1 |
| 2014/0052844 A1* | 2/2014 | Nayak | H04L 67/1097 709/224 |
| 2014/0059036 A1* | 2/2014 | Das | G06F 17/30896 707/711 |
| 2014/0068343 A1* | 3/2014 | Nakajima | G06F 11/3051 714/39 |
| 2014/0101279 A1* | 4/2014 | Nagami | H04L 67/1097 709/213 |
| 2014/0130055 A1* | 5/2014 | Guha | G06F 3/0604 718/104 |
| 2014/0380332 A1* | 12/2014 | Mathur | H04L 29/06 718/104 |
| 2015/0293708 A1* | 10/2015 | Lang | G06F 3/0613 711/114 |

OTHER PUBLICATIONS

United States Patent and Trademark Office, U.S. Appl. No. 14/253,795, Final Office Action dated Oct. 1, 2014.
United States Patent and Trademark Office, U.S. Appl. No. 14/253,795, Notice of Allowance dated Feb. 27, 2015.
Net App, "NetApp OnCommand Balance Library", http://www.netapp.com/us/products/management-software/oncommand-balance/balance-library.aspx#. , dated Jan. 2014, 1 page.
Transcript of "Which of my VMs are Bullies? Or Victims?", http://www.netapp.com/us/products/management-software/oncommand-balance/balancelibrary.aspx#, Jan. 2014, 3 pages.

* cited by examiner

Original search: 1001
search "error" | stats count BY host

Sent to peers: 1002
search "error" | prestats count BY host

Executed by search head: 1003
Merge the prestats results received from peers (reduce)

FIG. 10

DIAGNOSING CAUSES OF PERFORMANCE ISSUES OF VIRTUAL MACHINES

CROSS-REFERENCE TO RELATED APPLICATIONS

The present application claims benefit as a Continuation of U.S. application Ser. No. 14/253,795, filed Apr. 15, 2014, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The disclosure generally relates to determining and presenting information relating to virtual machines and the performance of volumes used by the virtual machines for storage.

BACKGROUND

In a virtualized environment, a large number of virtual machines can operate on a single physical host. Many customers elect to use virtual machines for their data computing needs due to the various advantages that a virtualized environment can offer over a non-virtualized environment, such as greater availability, lower costs, and simpler upgrades. When a virtual machine is created, the physical host allocates resources such as central processing units (CPUs) and memory to the virtual machine. For disk space, the virtual machine may use the storage resources of a storage provider that is different from the physical host that provides CPU and memory resources to the virtual machine. For example, the data generated and used by the virtual machine may be stored in volumes managed by a storage controller, such as a filer that operates on a separate machine than the physical host of the virtual machine and uses software provided by a different vendor than the vendor of the virtualization software.

A performance issue originating in the storage environment, such as a problem affecting a particular volume or a storage controller that manages the particular volume, can affect the performance of the virtual machine that utilizes the particular volume. However, in other cases the poor performance of a virtual machine can be attributed to a different source; for example, the problem may be specific to the virtual machine itself, to the communication network used by the virtual machine, the underlying physical host, or some other entity. Many times it is difficult for customers to pinpoint the source of the problem. Better approaches for presenting information to assist a customer in diagnosing the source of a problem that affects a virtual machine are needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 illustrates an example of a search query received from a client that the search head can split into two parts, according to an embodiment of the invention.

DESCRIPTION OF EXAMPLE EMBODIMENTS

Figure 1:
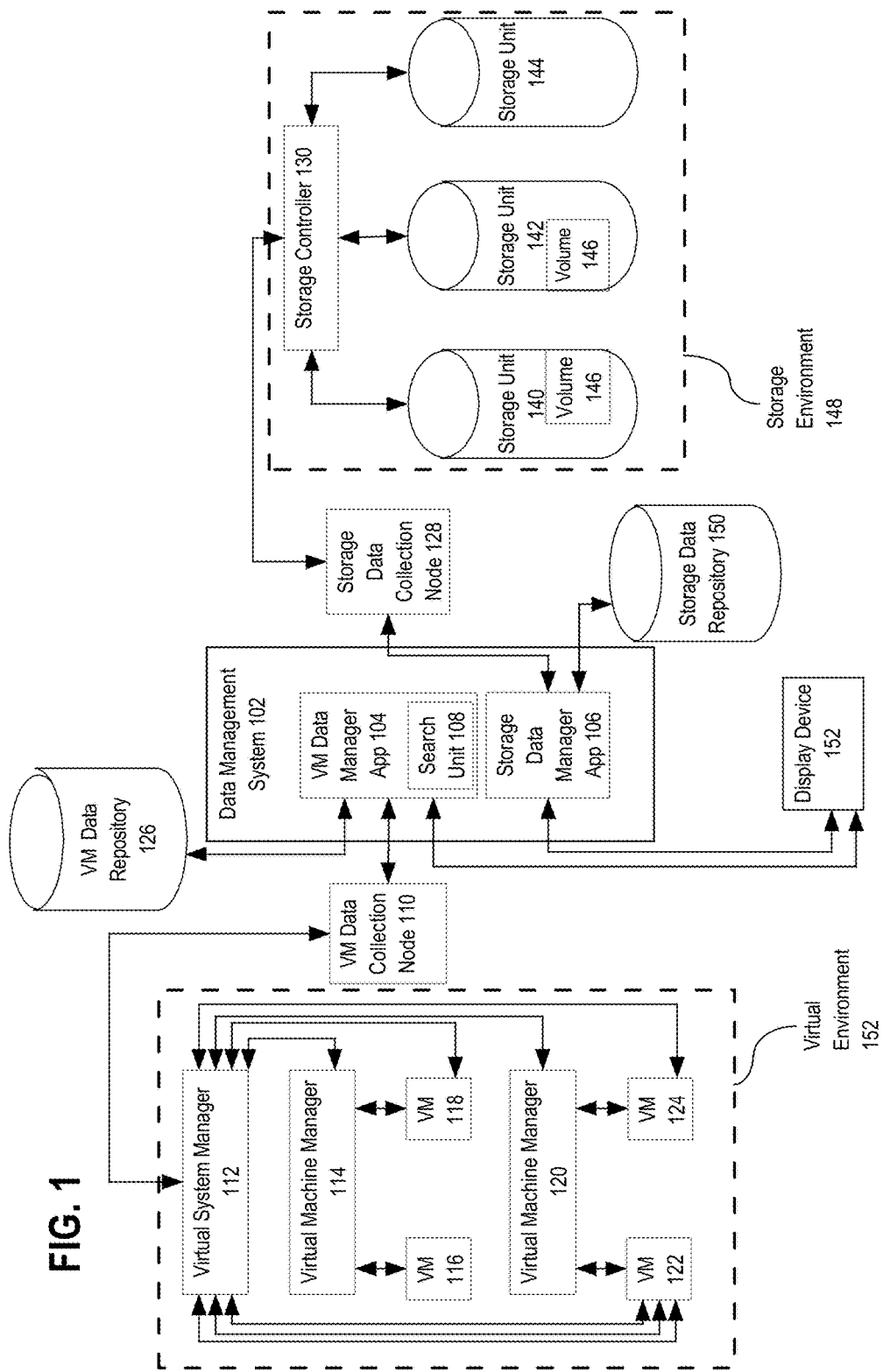
FIG. 1 illustrates an example network-based system of computing devices in which the described techniques may be practiced, according to an embodiment.

Example embodiments, which relate to correlation and associated display of virtual machine data and storage performance data, are described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Operating Environment
3.0 Example Collection, Correlation, and Display Processes
4.0 Implementation Mechanisms—Hardware Overview
5.0 Extensions and Alternatives
1. General Overview This overview presents a basic description of some aspects of embodiment(s) of the present invention. It should be noted that this overview is not an extensive or exhaustive summary of aspects of the embodiment. Moreover, it should be noted that this overview is not intended to be understood as identifying any particularly significant aspects or elements of the embodiment(s), nor as delineating any scope of the embodiment(s) in particular, nor the invention in general. This overview merely presents some concepts that relate to example embodiments in a condensed and simplified format, and should be understood as merely a conceptual prelude to a more detailed description of example embodiments that follows below.

In an embodiment, a data management system obtains data from both a virtual system manager that manages the virtualized environment and a storage controller that manages the storage of information in one or more disks. The virtual system manager may provide a variety of information relating to the virtual machines managed by the virtual machine manager or the physical hosts of the virtual machines including, but not limited to, names of the entities in the virtualized environment, changes in the configuration of various virtual machines, information relating to migrations of the virtual machines, amount of memory or CPU resources assigned to the virtual machines, performance of the virtual machines, an identification of volumes that the virtual machines are configured to use, and the amount of storage space utilized in the volumes by various virtual machines.

Similarly, the storage controller may provide a variety of information relating to the entities managed by the storage controller or the storage controller itself, such as the virtual machines managed by the storage controller, the names of and hierarchy between different entities of the storage environment, and performance of the volumes or disks managed by the storage controller or the storage controller itself.

Records obtained from the virtual system manager and records obtained from the storage controller may be correlated. For example, based on a determination that one or more particular storage data records relate to a particular volume used by a particular virtual machine to which one or more particular virtual machine data records relate, the data management system may correlate the one or more particular storage data records with the one or more particular virtual machine data records.

Based on the correlated data records, the data management system may display virtual machine data in association with storage data. In one embodiment, performance information for a particular virtual machine is displayed on a first screen and, in response to a user selection, performance information specifically for the volume that the particular virtual machine uses is displayed on the next screen, within the same application.

In another embodiment, the data management system displays an interface that identifies the capacity of a volume, the path that a virtual machine uses to access the volume, and performance information for the particular volume. The capacity of the volume, the path that a virtual machine uses to access the volume, and the performance of the virtual machine may be determined based on records obtained from the virtual system manager and the volume performance information may be identified based on records obtained from the storage controller.

The associated display of virtual machine data and the storage data may allow a user to more easily diagnose the root cause of a performance issue affecting a virtual machine.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2. Operating Environment

There is tremendous growth in the amount of data generated in the world. With decreasing storage costs and seemingly infinite capacity due to cloud services, there are fewer reasons to discard old data, and many reasons to keep it. As a result, challenges have shifted towards extracting useful information from massive quantities of data.

Mining a massive dataset is non-trivial but a more challenging task is to cross-correlate and mine multiple datasets from various sources. For example, a datacenter monitors data from thousands of components; the log format and collection granularities vary by component type and generation. The only underlying assumption that can be made is that each component has a notion of time, either via timestamps or event sequences, that is captured in the logs. As the quantity and diversity of data grow, there is an increasing need for performing full text searches to mine the data.

Another challenge is that a large fraction of the world's data is unstructured, making it difficult to index and query using traditional databases. Even if a dataset is structured, the specifics of the structure may evolve with time, for example, as a consequence of system upgrades or more/less restrictive data collection/retention policies.

SPLUNK® ENTERPRISE is software produced and sold for on-premise and cloud use by Splunk Inc. of San Francisco, Calif. SPLUNK ENTERPRISE is a comprehensive system that generates, stores, retrieves, and searches event data. SPLUNK® ENTERPRISE has gained particular appeal in the market for deriving events from unstructured data and machine data. It is the leading software for providing real-time operational intelligence, enabling organizations to collect, index, and harness machine-generated big data coming from the websites, applications, servers, networks, mobile devices, etc., that power their businesses.

At a high level, SPLUNK® ENTERPRISE can take raw data, unstructured data, or machine data such as data in Web logs, syslogs, sensor readings, etc., divide the data up into portions, and optionally transform at least part of the data in these portions to produce time-stamped events. The software derives the time stamp for each event by extracting it from the event data itself or by interpolating an event's time stamp relative to other events for which the software can derive a time stamp. SPLUNK® ENTERPRISE then stores the events in a time-series data store against which it can run queries to retrieve events that meet specified criteria, such as having certain keywords and/or having certain value(s) for certain defined field(s).

SPLUNK® ENTERPRISE is particularly noteworthy for employing a so-called "late-binding schema." As noted, an event in SPLUNK® ENTERPRISE typically contains a portion of raw data (or a transformed version of such). To run queries against events other than those involving keyword searches, a schema can be developed. Such a schema can include extraction rules for one or more fields. Each field can be defined for a subset of the events in the data store and an extraction rule can specify how to extract a value from each of the subset of events for which the field has been defined. The extraction rule for a field is often defined using a regular expression ("regex" rule), and it associates event data with a logical type of information that is contained within an event for which it is defined. The term "late-binding schema" refers to a system, such as in SPLUNK® ENTERPRISE, which does not define the schema at index time as with database technology; rather, in a system involving late-binding schema, the schema can be developed on an ongoing basis up until the time it needs to be applied (which is query time, as a query often specifies the criteria for events of interest in terms of events having specified value(s) for specified field(s)). As a data analyst learns more about the data in stored events, using a late-binding schema, he can continue to develop the schema up until the next time it is needed for a query.

Because SPLUNK® ENTERPRISE maintains the underlying searchable raw data and enables application of a late-binding schema, it has great power to enable dynamic investigation of issues that arise as a data analyst learns more about the data stored in the system's events.

As discussed herein, "time-series data" and "time-series machine data" may include, among other things, a series or sequence of data points generated by one or more data sources, computing devices, or sensors. Each data point may be a value, a small segment of data, or a large segment of data, and each data point may be associated with a timestamp or be associated with a particular point in time that provides the basis for a timestamp for the data point. The series of data points, or values/statistics derived from the data points, may be plotted over a time range or time axis representing at least a portion of the time range. The data can be structured, unstructured, or semi-structured and can come from files, directories, network packets, network events, and/or sensors. Unstructured data may refer, for example, to data whose structure is not fully understood or appreciated at the time the data is obtained by a data storage system, or it may refer to data that was generated without a particular schema in mind to facilitate the extraction of values for fields in the data during a search on the data. Machine data generated by, for example, data sources within an enterprise network environment is generally considered to be unstructured data. The visualization of such time-series data may be used to display statistical trends over time. The time-series machine data collected from a data source may be segmented or otherwise transformed into discrete events, where each event can be associated with a timestamp.

An "event" may include a single record of activity from a particular data source associated with a single timestamp. Such an event may correspond to, for example, one or more lines in a log file or other data input. Further, "events" may be derived from processing or indexing machine data, as described herein, or may include other kinds of events or notable events described herein. Events can also correspond to any time-series data, such as performance measurements of an IT component (e.g., a computer cluster, node, host, virtual machine, etc.), a sensor measurement, etc.

In an example, a field extractor within an enterprise network environment may be configured to automatically identify (e.g., using regular expression-based rules, delimiter-based rules, etc.) certain fields in the events while the events are being created, indexed, and/or stored. Alternatively, one or more fields can be identified within the events and added to the field extraction rules (used by the field extractor to identify fields within the events) by a user using a variety of techniques. Additionally, fields that correspond to metadata about the events, such as a timestamp, host, source, and source type for an event, may also be created; such fields may, in some cases, be referred to as "default fields" if they are determined automatically for all events at the time such events are created, indexed, and/or stored.

In some implementations, a given tag or alias may be assigned to a set of two or more fields to identify multiple fields that correspond to equivalent pieces of information, even though those fields may have different names or be defined for different sets of events. A set of tags or aliases used to identify equivalent fields in this way may be referred to as a common information model.

Data generated by various data sources may be collected and segmented into discrete events, each event corresponding to data from a particular point in time. Examples of such data sources include, but are not limited to, web servers, application servers, databases, firewalls, routers, operating systems, software applications executable at one or more computing devices within the enterprise data system, mobile devices, sensors, etc. The types of data generated by such data sources may be in various forms including, for example and without limitation, server log files, activity log files, configuration files, messages, network packet data, performance measurements or metrics, sensor measurements, etc.

Figure 7:
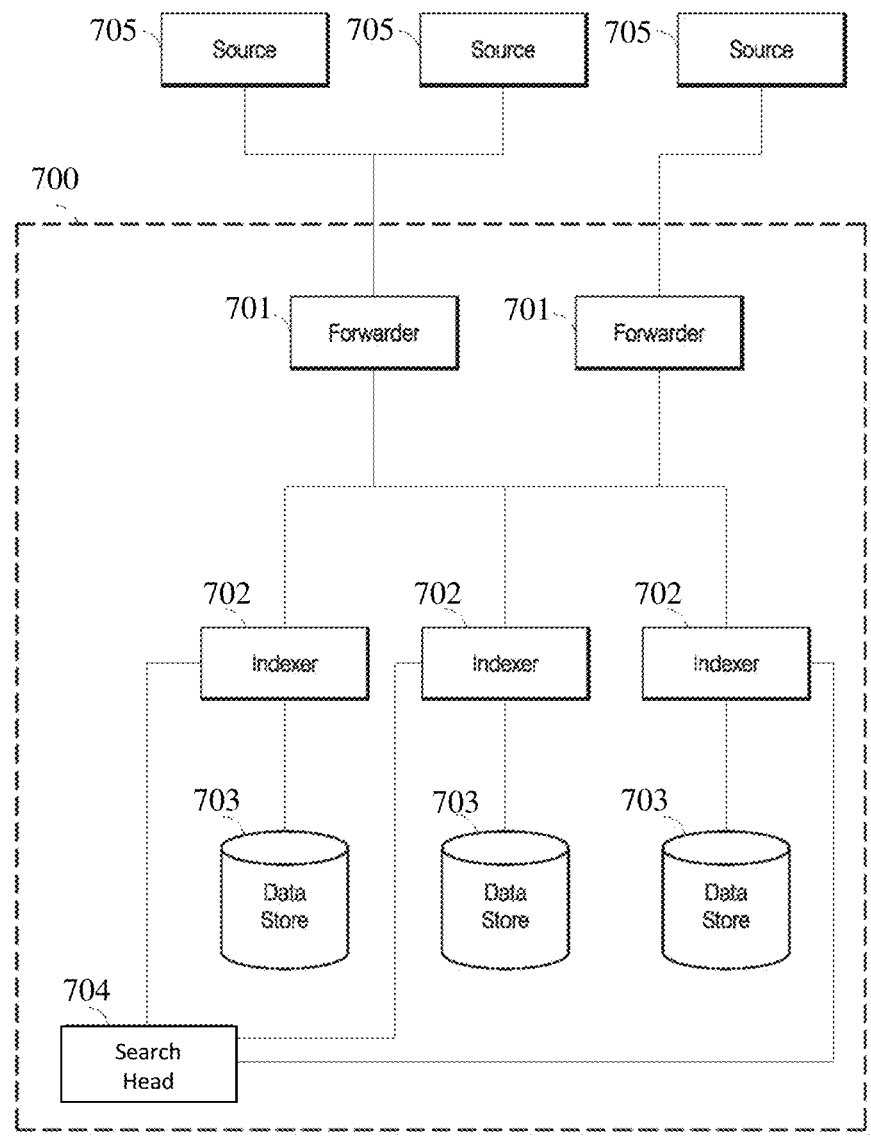
FIG. 7 illustrates an example block diagram of a data intake and query system, according to an embodiment of the invention.

FIG. 7 shows a block diagram of SPLUNK® ENTERPRISE's data intake and query system, which provides an example embodiment of a data intake and query system 700. Generally, the system 700 includes one or more forwarders 701 that collect data from a variety of different data sources 705. The forwarders determine which indexer or indexers are to receive the data and forward the data to one or more indexers 702. The data typically includes streams of time-series data. Time-series data refers to any data that can be segmented such that each segment can be associated with a time stamp. The data can be structured, unstructured, or semi-structured and can come from files and directories. Unstructured data is data that is not organized to facilitate the extraction of values for fields from the data, as is often the case with machine data and web logs, two popular data sources for SPLUNK® ENTERPRISE. Alternatively, heavy forwarders can strip out extraneous data and detect time stamps for the data. Based on the time stamps, the heavy forwarders can index and group the data into buckets that fall within a common time span. The heavy forwarders then determine which indexer or indexers are to receive each bucket of data and forward the data to one or more indexers 702.

Figure 8:
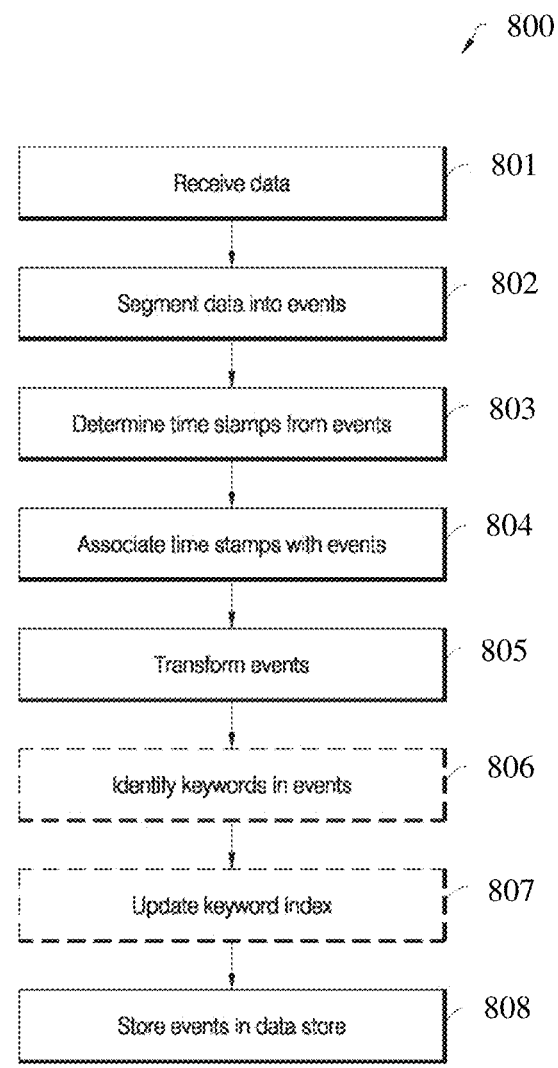
FIG. 8 illustrates a flowchart of a process that indexers may use to process, index, and store data received from forwarders, according to an embodiment of the invention.

FIG. 8 is a flowchart 800 of a process that indexers 702 may use to process, index, and store data received from the forwarders 701. At block 801, an indexer 702 receives data from a forwarder 701. At block 802, the indexer segments the data into events. The data typically consists of many lines of text that are separated by a carriage return or line break. An event may consist of one or more of these lines. The task of the indexer is to determine where an event begins and ends in the lines of data. The indexer can use heuristics that allow it to automatically determine how many lines constitute an event. The indexer may be informed of the source of the data and have a set of heuristic rules for the source. The indexer may also be able to examine a sampling of the data and automatically determine the source of the data and have a set of heuristic rules for that source. These heuristics allow the indexer to use regular expression-based rules, delimiter-based rules, etc., to examine the text in each line in order to combine lines of data to form an event. The indexer can examine the text for event boundaries within the text that include, but are not limited to: predefined characters, character strings, etc. These may include certain punctuation marks or special characters including, for example, carriage returns, tabs, spaces, line breaks, etc. In some instances, a user can fine tune or configure the rules that the indexers use to examine the text in order to adapt to the user's equipment.

The indexer determines a time stamp for each event at block 803. The time stamp can be determined by extracting the time from data in the event or by interpolating the time based on time stamps from other events. In some cases, a time stamp can be determined from the time the data was received or generated. The indexer associates the time stamp with each event at block 804. For example, the time stamp may be stored as metadata for the event.

At block 805, the data included in a given event can be transformed. Such a transformation can include such actions as removing part of an event (e.g., a portion used to define event boundaries, extraneous text, characters, etc.) or removing redundant portions of an event. A user can specify a portion to remove using a regular expression or any similar method.

Optionally, a key word index can be built to facilitate fast keyword searching of events. To build such an index, in block 806, the indexer identifies a set of keywords contained in the events. At block 807, the indexer includes each identified keyword in an index, which associates with each stored keyword pointers to each event containing that keyword (or locations within events where that keyword is found). When an indexer receives a keyword-based query, the indexer can then consult this index to quickly find those events containing the keyword without having to examine again each individual event, thereby greatly accelerating keyword searches.

The indexer stores events in a data store at block 808. The data can be stored in working, short-term and/or long-term memory in a manner retrievable by query. The time stamp can be stored along with each event to help optimize searching the events by time range.

In some instances, the stored data includes a plurality of individual storage buckets, each corresponding to a time range. An event can then be stored in a bucket associated with a time range inclusive of the event's time stamp. This not only optimizes time based searches, but it can allow events with recent time stamps that may have a higher likelihood of being accessed to be stored at preferable memory locations that lend to quicker subsequent retrieval (such as flash memory instead of hard disk media).

Data stores 703 may be distributed across multiple indexers, each responsible for storing and searching a subset, or buckets, of the events generated by the system. By distributing the time-based buckets among the indexers, the indexers can find events responsive to a query in parallel using map-reduce techniques, each returning their partial responses for specific buckets to the query to a search head that combines the results together to answer the query.

Figure 9:
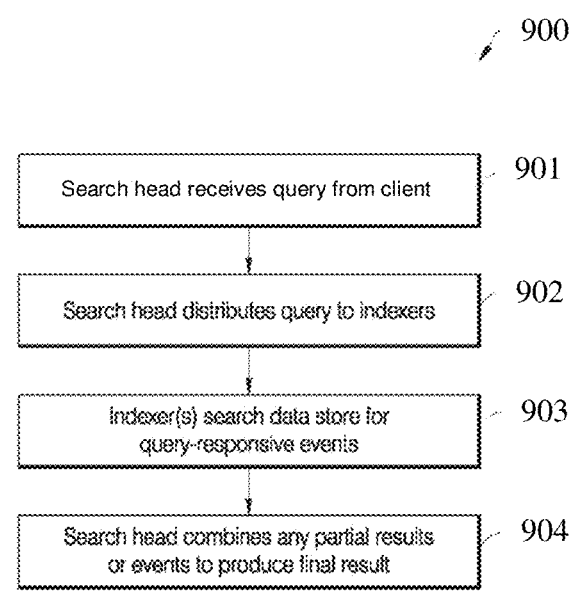
FIG. 9 illustrates a flowchart of a process that a search head and indexers perform during a typical search query, according to an embodiment of the invention.

FIG. 9 is a flowchart 900 of a process that a search head 704 and indexers 702 may perform during a typical search query. At block 901, a search head receives a query from a client.

At block 902, the search head is responsible for analyzing the search query to determine what part can be delegated for execution by indexers and what part needs to be executed by the search head. Streaming commands can be trivially delegated to the indexers. Conversely, aggregating commands are more complex to distribute.

The search head can perform optimization steps in order to make the search more efficient. As mentioned above, the indexers may create an index of keywords. In one optimization, before the search starts executing, the search head determines the time range required for the search and a set of common keywords that all matching events must have. The retrieval phase uses these parameters to query the indexers for a superset of the eventual results. The indexers return the superset of results that the search head can perform a filtering stage on. The filtering stage performs field extraction on the superset to arrive at a reduced set of search results.

In another optimization, to achieve better computation distribution and minimize the amount of data transferred between indexers and the search head, many aggregating commands implement a map operation which the search head can delegate to the indexers while executing the reduce operation locally. FIG. 10 shows an example of a search query 1001 received from a client that the search head can split into two parts: one part to be executed by indexers 1002 and one part to be executed by the search head 1003. Here, the search query 1002 makes the indexers responsible for counting the results by host and then sending their results to the search head. The search head then performs the merging 1003. This achieves both computation distribution and minimal data transfer.

The search head distributes the indexer search query to one or more distributed indexers. The search query may contain one or more regular expressions that the indexer is to apply to any event data that is found to fall within the parameters of the regular expression. These indexers can include those with access to data stores having events responsive to the query. For example, the indexers can include those with access to events with time stamps within part or all of a time period identified in the query.

At block 903, one or more indexers to which the query was distributed searches its data store for events responsive to the query. To determine events responsive to the query, a searching indexer finds events specified by the criteria in the query. This criteria can include that the events have particular keywords or contain a specified value or values for a specified field or fields (because this employs a late-binding schema, extraction of values from events to determine those that meet the specified criteria occurs at the time this query is processed). It should be appreciated that, to achieve high availability and to provide for disaster recovery, events may be replicated in multiple data stores, in which case indexers with access to the redundant events and not assigned as the primary indexer for the events, would not respond to the query by processing the redundant events. In an example, the indexer finds events that it is the primary indexer for that fall within a block of time specified by the one or more regular expressions. The indexer then processes the contents of the events using the one or more regular expressions, extracting information associated with fields specified in the one or more regular expressions. The indexers can either stream the relevant events back to the search head or use the events to calculate a partial result responsive to the query and send the partial result back to the search head. At block 904, the search head combines or reduces all of the partial results or events received from the parallel processing indexers together to determine a final result responsive to the query.

Data intake and query system 700 and the processes described with respect to FIGS. 1-4 are further discussed and elaborated upon in Carasso, David. Exploring Splunk Search Processing Language (SPL) Primer and Cookbook. New York: CITO Research, 2012 and in Ledion Bitincka, Archana Ganapathi, Stephen Sorkin, and Steve Zhang. Optimizing data analysis with a semi-structured time series database. In SLAML, 8070. Each of these references is hereby incorporated by reference in its entirety for all purposes.

SPLUNK® ENTERPRISE can accelerate some queries used to periodically generate reports that, upon each subsequent execution, are intended to include updated data. To accelerate such reports, a summarization engine periodically generates a summary of data responsive to the query defining the report for a defined, non-overlapping subset of the time period covered by the report. For example, where the query is meant to identify events meeting specified criteria, a summary for a given time period may include only those events meeting the criteria. Likewise, if the query is for a statistic calculated from events, such as the number of events meeting certain criteria, then a summary for a given time period may be the number of events in that period meeting the criteria.

Because the report, whenever it is run, includes older time periods, a summary for an older time period can save the work of having to re-run the query on a time period for which a summary was generated, so only the newer data needs to be accounted for. Summaries of historical time periods may also be accumulated to save the work of re-running the query on each historical time period whenever the report is updated.

A process for generating such a summary or report can begin by periodically repeating a query used to define a report. The repeated query performance may focus on recent events. The summarization engine determines automatically from the query whether generation of updated reports can be accelerated by creating intermediate summaries for past time periods. If it can, then a summarization engine can periodically create a non-overlapping intermediate summary covering new data obtained during a recent, non-overlapping time period and stores the summary in a summary data store.

In parallel to the creation of the summaries, the query engine schedules the periodic updating of the report defined by the query. At each scheduled report update, the query engine determines whether intermediate summaries have been generated covering parts of the time period covered by the current report update. If such summaries exist, then the report is based on the information from the summaries; optionally, if additional data has been received that has not yet been summarized but that is required to generate a complete report, then the query is run on this data and, together with the data from the intermediate summaries, the updated current report is generated. This process repeats each time an updated report is scheduled for creation.

Search and report acceleration methods are described in U.S. Pat. No. 8,589,403, issued on Nov. 19, 2013, and U.S. Pat. No. 8,412,696, issued on Apr. 2, 2011, both of which are hereby incorporated by reference in their entirety for all purposes.

The data processing techniques described herein are suitable for use by systems deployed in a variety of operating environments. FIG. 1 illustrates an example network-based system 100 of computing devices in which the described techniques may be practiced, according to an embodiment.

Data management system 102 represents one or more computing devices that may collect, index, and correlate data from both virtual system manager 112 and storage controller 130.

VM data collection node 110 obtains data relating to virtual environment 152 from virtual system manager 112. In an embodiment, VM data collection node 110 collects the data by making calls to an Application Program Interface (API) made available by virtual system manager 112.

Virtual environment 152 comprises virtual machine manager 114, which manages virtual machines 116 and 118, and virtual machine manager 120, which manages virtual machines 122 and 124. Virtual machine managers 114 and 120 may be hypervisors that provide services such as allocation and partitioning, which allow the respective virtual machines that they manage to share the same physical host. Virtual system manager 112 manages the virtual machine managers and virtual machines in virtual environment 152 by providing services such as configuration of virtual machine managers and virtual machines, performance monitoring, and optimization of resource usage. Virtual system manager 112 may operate on a virtual machine within virtual environment 152 or on a physical or virtual machine outside virtual environment 152. VM data collection node 110 may be configured to re-structure or otherwise modify the data obtained from virtual system manager 112 to conform to a particular format before forwarding the data to VM data manager app 104 at data management system 102.

VM data manager app 104 stores the data received from virtual system manager 112 in one or more virtual machine data indexes in VM data repository 126, which is communicatively coupled to data management system 102. VM data manager app 104 comprises instructions for the display of graphical interfaces that may be presented to customers for the monitoring of events occurring in virtual environment 152 or for troubleshooting any problems affecting virtual environment 152. VM data manager app 104 may cause the graphical interfaces to display at a customer device, such as client device 152. Client device 152 may be any computing device including but not limited to a personal computer, laptop, mobile phone, mobile device, tablet computer, or a wearable computing device.

Storage data collection node 128 collects data relating to storage environment 148 from storage controller 130. In on embodiment, storage data collection node 128 collects the data by making calls to an API made available by storage controller 130. VM data collection node 110 and storage data collection node 128 may be forwarders such as forwarders 701 in FIG. 7.

Storage controller 130 manages the storage of data across various storage units, such as storage units 140, 142, and 144. Storage units 140, 142, and 144 may each be separate physical disks managed by storage controller 130. Storage controller 130 performs a variety of storage management tasks, such as selecting the layout of data across different storage units and monitoring the performance of different storage units.

Virtual machines in virtual environment 152 may store their data in storage environment 148. Storage controller 130 may present portions of different storage units as a single contiguous volume to a virtual machine. For example, virtual machine 118 may send a request to storage controller 130 to store or retrieve data from a particular volume, and storage controller 130 may determine the locations at which to store the data or from which to retrieve the data in response to the request. The determined locations may span multiple storage units.

Storage data collection node 128 may be configured to re-structure or otherwise modify the data obtained from storage controller 130 to conform to a particular format before forwarding the data to storage data manage app 106 at data management system 102. VM data manager app 104 and storage data manager app 106 may both modify the data they respectively obtain to conform to the same format for easier retrieval of both types of data.

Storage data manager app 106 stores the data received from storage controller 130 in one or more storage data indexes in storage data repository 150, which is communicatively coupled to data management system 102. Storage data manager app 106 also comprises instructions for the display of graphical interfaces that may be presented to customers for monitoring events occurring in storage environment 148 or for troubleshooting any problems affecting storage environment 148. Storage data manager app 106 may cause the graphical interfaces to display at a customer device, such as client device 152.

Search unit 108 in VM data manager app 104 may search for data in both VM data repository 126 and storage data repository 150 and may perform a correlation of the retrieved data. Thus, VM data manager app 104 may have access to both virtual machine data records stored in VM data repository 126 and storage data records stored in storage data repository 150. In other embodiments, storage data manager app 106 may perform the searching and correlation and, in such an embodiment, search unit 108 may be a component of storage data manager app 106.

In an embodiment, software used to implement virtual environment 152, including software, which when executed, performs the functionality of virtual system manager 112 and virtual machine managers 114 and 120 is provided by vendor of virtualization software that is different than the storage vendor that provides software used to implement storage environment 148. The storage vendor may provide software that performs the functions of storage controller 130. For example, a virtualization company such as VMware, Inc. may provide software that performs the functions of virtual system manager 112 and virtual machine managers 114 and 120 and a storage company such as NetApp, Inc. or EMC Corp. may provide software that performs the functions of storage controller 130.

3.0. Example Collection, Correlation, and Display Processes

Figure 2:
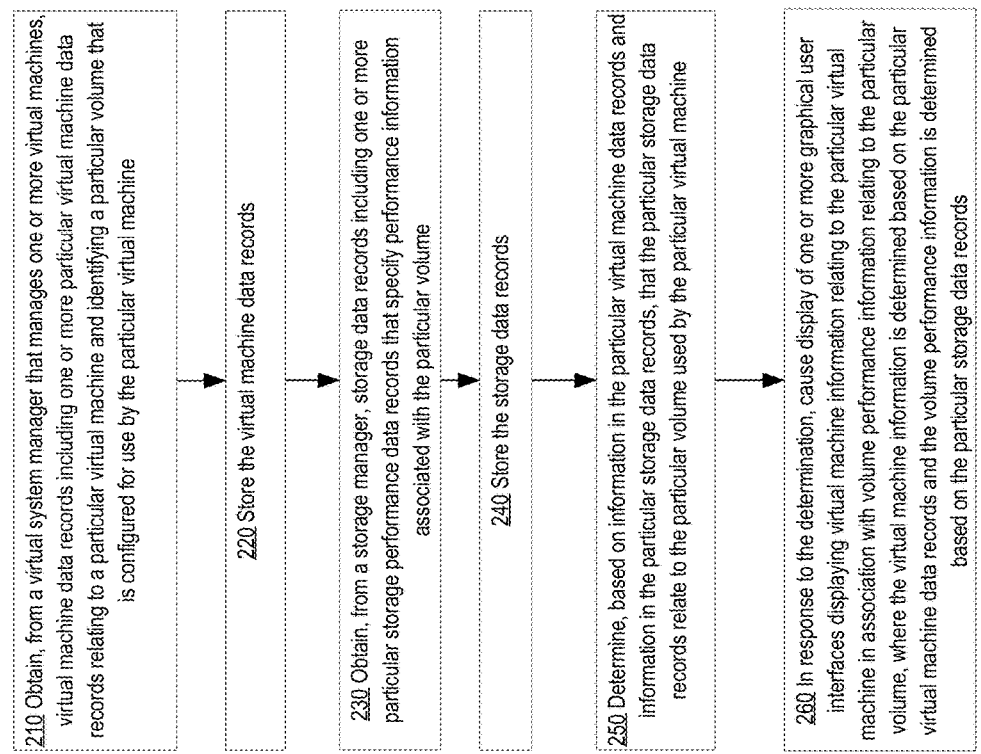
FIG. 2 illustrates an example process for the collection, correlation, and display of data from a virtual system manager and a storage controller.

FIG. 2 illustrates an example process for the collection, correlation, and display of data obtained from a virtual system manager and a storage controller. In one embodiment, the process of FIG. 2 is performed at one or more computers within data management system 102.

At block 210, VM data manager app 104 obtains, from virtual system manager 112, which manages one or more virtual machines, virtual machine data records including one or more particular virtual machine data records relating to a particular virtual machine and identifying a particular volume that is configured for use by the particular virtual machine. The received virtual machine data records may relate to a plurality of virtual machines including the particular virtual machine to which the particular virtual machine data records relate.

The virtual machine data records may indicate a variety of information including, but not limited to, the performance of virtual machines 116, 118, 122, and 124 (e.g., CPU usage and/or memory usage by each of the virtual machines, etc.), the performance of virtual machine managers 114 and 120 which host virtual machines 116, 118, 122, and 124, the names of virtual machines 116, 118, 122, and 124 and virtual machine managers 114 and 120, the topology of virtual environment 152 (e.g., for each virtual machine, an identification of the physical machine that hosts the virtual machine and, for each virtual machine, the virtual system manager that manages the virtual machine, etc.), and tasks and events that occurred within virtual environment 152 (e.g., a log of configuration changes to virtual machines 116, 118, 122, and 124, etc.). The virtual machine data records may identify a volume that a virtual machine uses by specifying the name of the volume and identifying the storage controller that manages the volume, such as by specifying the storage controller's Internet Protocol (IP) address. In an embodiment, the virtual machines in virtual environment 152 use volumes in storage environment 148 for their data storage needs and the volumes in storage environment 148 are managed by a separate device and/or application than virtual system manager 112. Thus, virtual system manager 112 may not provide performance information for any of the volumes used by the virtual machines in virtual environment 152.

Data management system 102 may receive virtual machine data records from virtual system manager 112 via data collector node 110. In an embodiment, data collector node 110 obtains the data from virtual system manager 112 by periodically issuing requests for particular information to virtual system manager 112. Data collector node 110 may modify data obtained from virtual manager 114, such as reformatting the data to conform to a particular format, before forwarding the data to data management system 102.

At block 220, VM data manager app 104 stores the virtual machine data records. The virtual machine data records may be stored within indexes at VM data repository 126. In some embodiments, data management system 102 may modify the virtual machine data records to conform to a particular format in addition to, or instead of, any modifications that data collector node 110 performs to the virtual machine data records.

At block 230, storage data manager app 106 obtains, from a storage controller, storage data records including one or more particular storage data records that specify performance information associated with the particular volume. The received storage data records may relate to a plurality of volumes including the particular volume to which the particular storage data records relate.

Storage data records may indicate a variety of information including, but not limited to, the performance of various storage entities in storage environment 148, such as storage controller 130, storage units 140, 142, 144, volume 146, etc. Performance of the various storage entities may be indicated using any of a variety of metrics including an average or median amount of latency for requests sent to the storage entity or as an amount of input/output operations performed per second by the storage entity. Storage data records may specify the names and capacity of various storage entities in storage environment 148 (e.g., storage units 140, 142, 144, and volume 146), the Internet Protocol (IP) addresses of storage controller 130, and the topology of the storage environment (e.g., an identification of which storage units and which volumes are managed by which storage controllers, etc.). The storage data records may identify a volume by specifying a volume name and identifying the storage controller that manages the volume.

In an embodiment, storage controller 130 is a separate device and/or application than virtual system manager 112 and storage controller 130 only provides information about the storage environment 148 and does not provide any general information about the performance of virtual machines that utilize storage entities in storage environment 148. For example, although storage data records received from storage controller 130 may indicate an amount of disk space utilized by a virtual machine, the storage data records may not specify how the virtual machine is performing.

Storage data manager app 106 may receive storage data records from storage controller 130 via storage data collection node 128. In an embodiment, storage data collection node 128 obtains the data from storage controller 130 by periodically issuing requests for particular information to storage controller 130. Storage data collection node 128 may modify data obtained from storage controller 130, such as by reformatting the data to conform to a particular data format, before forwarding the data to data management system 102.

At block 240, storage data manager app 106 stores the storage data records. The storage data records may be stored within indexes at storage data repository 150. In some embodiments, data management system 102 may modify the storage data records to conform to a particular format in addition to, or instead of, any modifications that data collector node 128 performs to the storage data records.

Although the storage data records and the virtual machine data records may be obtained by different data collection nodes and/or stored by different applications, VM data manager app 104 and data manager app 106 may modify the virtual machine data records and storage data records respectively to conform to the same data format. Such an approach may allow for easier correlation of virtual machine data records and storage data records.

At block 250, VM data manager app 104 determines, based on information in the particular virtual machine data records and information in the particular storage data records, that the particular storage data records relate to the particular volume used by the particular virtual machine.

At block 260, VM data manager app 104 causes, in response to the determination, display of one or more graphical user interfaces displaying virtual machine information relating to the particular virtual machine in association with volume performance information relating to the particular volume, where the virtual machine information is determined based on the particular virtual machine data records and the volume performance information is determined based on the particular storage data records.

Example processes for the indexing, searching, and display of virtual machine information is described in U.S. patent application Ser. No. 14/167,316, titled "Correlation For User-Selected Time Ranges Of Values For Performance Metrics Of Components In An Information-Technology Environment With Log Data From That Information-Technology Environment" filed Jan. 29, 2014, the entire contents of which are hereby incorporated by reference for all purposes as if set forth herein.

Figure 3:
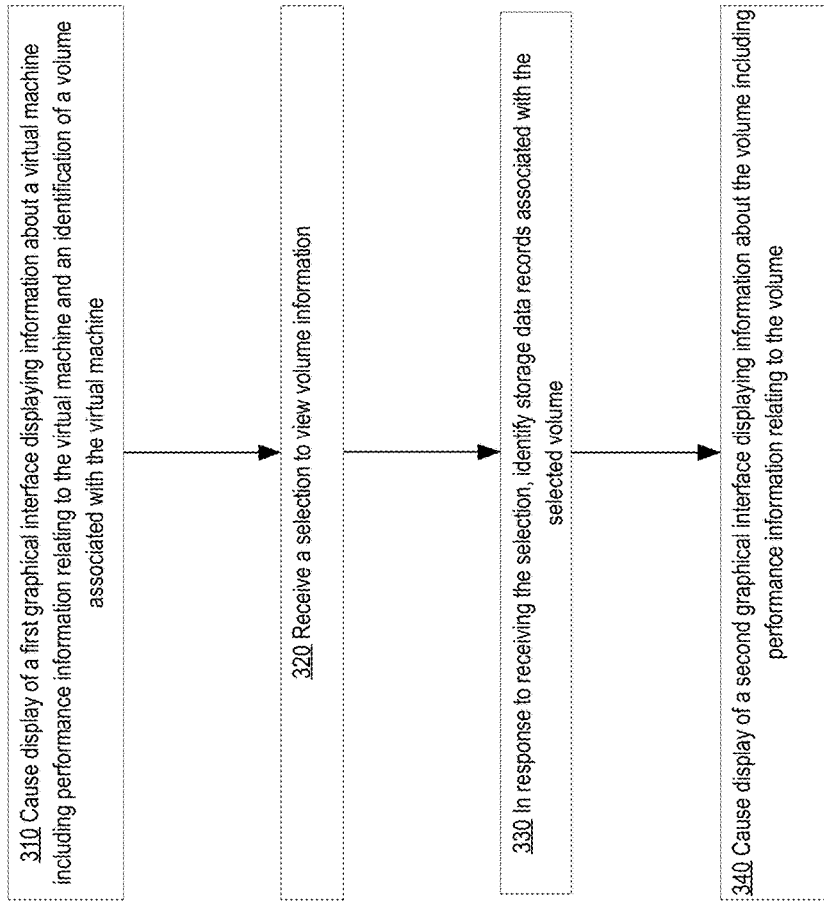
FIG. 3 illustrates an example process for the display of virtual machine information relating to a particular virtual machine in association with volume performance information.

FIG. 3 illustrates an example process for the display of virtual machine information relating to a particular virtual machine in association with volume performance information. In one embodiment, the process of FIG. 3 is performed at VM data manager app 104.

At block 310, VM data manager app 104 causes display of a first graphical interface displaying information about a virtual machine including performance information relating to the virtual machine and an identification of a volume associated with the virtual machine. The first graphical interface may be displayed at display device 152.

The first graphical interface may indicate information determined based on information received from virtual machine managers such as virtual machine manager 114 and not based on information received from storage controller such as storage controller 130.

Figure 4:
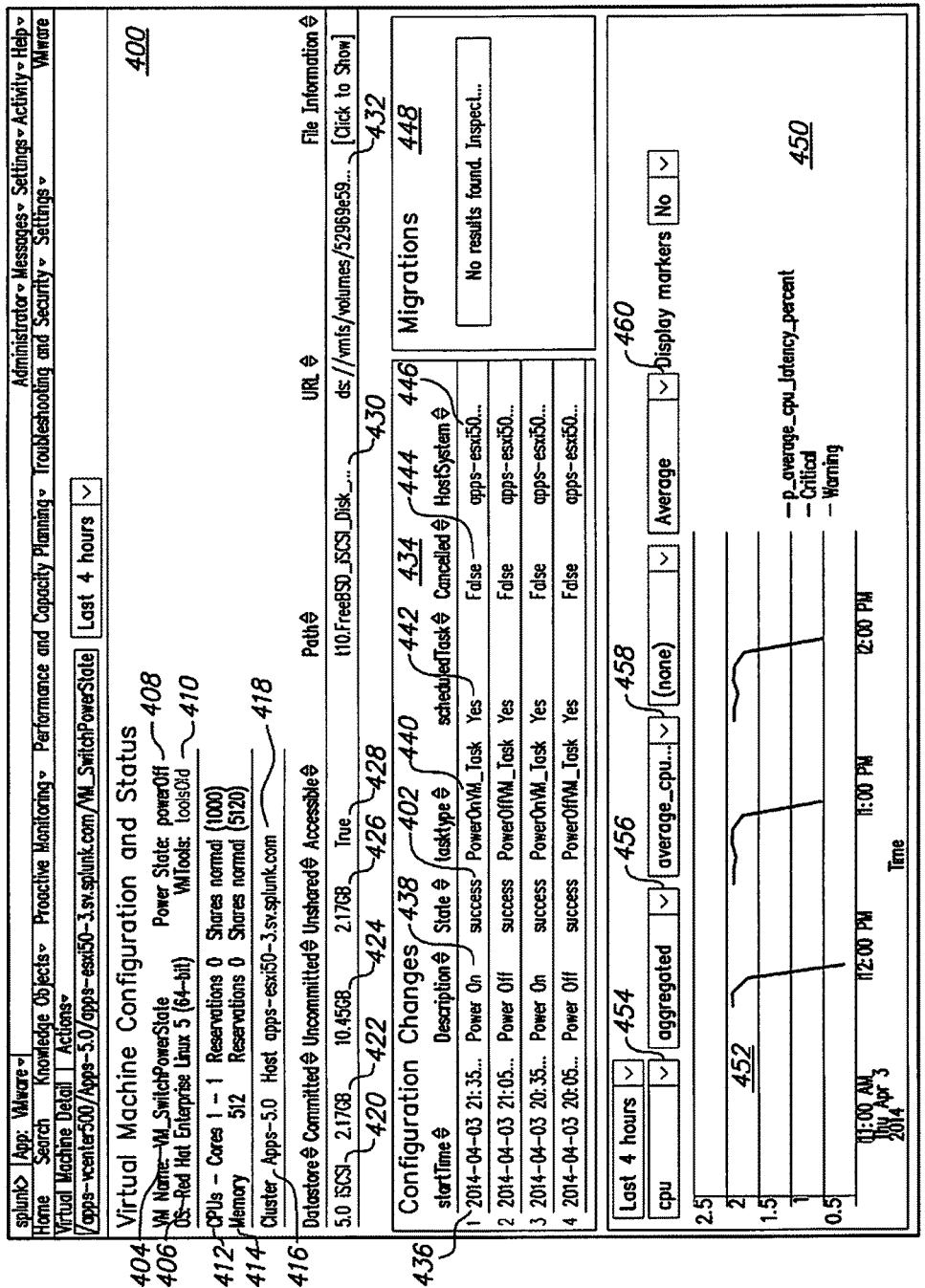
FIG. 4 illustrates an example graphical interface that includes performance information relating to the virtual machine and an identification of a volume associated with the virtual machine.

FIG. 4 illustrates an example graphical interface that includes performance information relating to the virtual machine and an identification of a volume associated with the virtual machine.

Interface 400 depicts an example virtual machine view which identifies different attributes of a particular virtual machine, including the name of the virtual machine (item 404), the operating system (item 406), power state (408), and the status of tools available to the virtual machine (item 410), the relationship between the amount of CPUs and cores available to the virtual machine (item 412), the amount of memory available to the virtual machine (item 414), the cluster to which the virtual machine belongs, where the cluster is a grouping of physical hosts(item 416), and the physical host of the virtual machine (item 418).

Interface 400 also identifies the name of the volume configured for use with the particular virtual machine (item 420), the amount of disk space committed for use by the particular virtual machine (item 422), the amount of disk uncommitted for use by the particular virtual machine (item 424), the amount of unshared disk space (item 426), whether the volume is accessible to the particular virtual machine (item 428), the path that the particular virtual machine uses to connect to the volume (item 430), and the uniform resource locator (URL) of the volume (item 432).

Region 434 describes properties of recent changes to the configuration of the particular virtual machine, including the time at which the configuration change was performed (item 436), the description of the configuration change (item 438), the state of the configuration change (item 402), the type of task that caused the configuration change (item 440), whether the task was scheduled (item 442), whether the configuration change was cancelled (item 444), and the system hosting the particular virtual machine at the time of the configuration change (item 446).

Region 448 identifies information relating to any migrations that the particular virtual machine may have experienced from one physical host to another. For example, region 448 may identify, for each recent migration, the physical host of the particular virtual machine before the migration, the physical host of the particular virtual machine after migration, and the time at which the migration occurred.

Region 450 identifies performance information for the particular virtual machine. Graph 452 indicates the average CPU latency for all the CPUs used by the particular virtual machine at different times. The average CPU latency is represented as a percentage of time the particular virtual machine is in the ready state awaiting CPU resources from its physical host.

Graph 452 indicates average CPU latencies for the past four hours. According to various embodiments, a variety of performance statistics may be presented. For example, in response to a user selecting the resource of memory for which to view performance information using menu 454, graph 452 may update to indicate performance related to memory resources.

Using menu 456, a user may specify whether performance statistics should be aggregated or be specific to a particular resource (i.e. a particular CPU). Using menu 458, a user may select to view a different performance metric such as the amount of memory pages that were used by the particular virtual machine at various times. Using menu 460, the user may specify which types of metric values to view (e.g., average, maximum, or minimum values).

Referring to FIG. 3, at block 320, data management system 102 receives a selection to view volume information. A user may indicate a selection to view volume information by selecting item 420, which specifies the name of the volume configured for use with the particular virtual machine.

At block 330, in response to receiving the selection, data management system 102 identifies storage data records associated with the selected volume. For example, VM data manager app 104 may determine the volume identifier of the selected volume by searching virtual machine data records in VM data repository 126. In particular, search unit 108 may locate the virtual machine data records associated with the particular virtual machine for which interface 400 displays information and search for a volume identifier in the located virtual machine data records. In response to determining the volume identifier of the selected volume, search unit 108 of VM data manager app 104 may search storage data repository 150 for storage data records relating to the selected volume by searching for storage data records that include the determined volume identifier.

In one embodiment, a volume may be identified in virtual machine data records and storage data records by a volume name and an IP address of the controller that manages the volume. In response to determining the volume name and IP address of the selected volume based on the virtual machine data records, VM data manager app 104 may cause storage data records containing the same determined volume name and IP address to be retrieved from storage data repository 150. Performance information for the selected volume may be determined for display based on the retrieved storage data records. For example, performance information from different performance information records may be aggregated and displayed in graph format.

Data management system 102 may comprise indexer(s) and search head(s) such as indexers 702 and search head 704 for the indexing and searching of virtual machine data records and storage data records. In an embodiment, in response to receiving the selection, a search heads formulates a schema for retrieving storage data records associated with the selected volume and distributes the schema to one or more indexers. The one or more indexers may apply the late-binding schema to events stored in one or more data repositories and return the retrieved storage data records to the search head. The search head may determine the performance information for the selected volume and other information for display based on the retrieved storage data records.

At block 340, VM data manager app 104 causes display of a second graphical interface displaying information about the volume including performance information relating to the volume. VM data manager app 104 may determine and send the instructions for display of the second graphical interface to display device 152. VM data manager app 104 may be located on the search head that receives the retrieved data from different indexers.

The second graphical interface may include information determined based on both virtual machine data records and storage data records. The virtual machine data records and storage data records may be stored according to the same format. For example, any identifications of a volume name in both the virtual machine data records and storage data records may be tagged with the same field name. As a result, VM data manager app 104 may determine that the value for a particular field in certain virtual machine data records and retrieve the records from storage data repository 150 that contain the same value for the particular field.

Figure 5A:
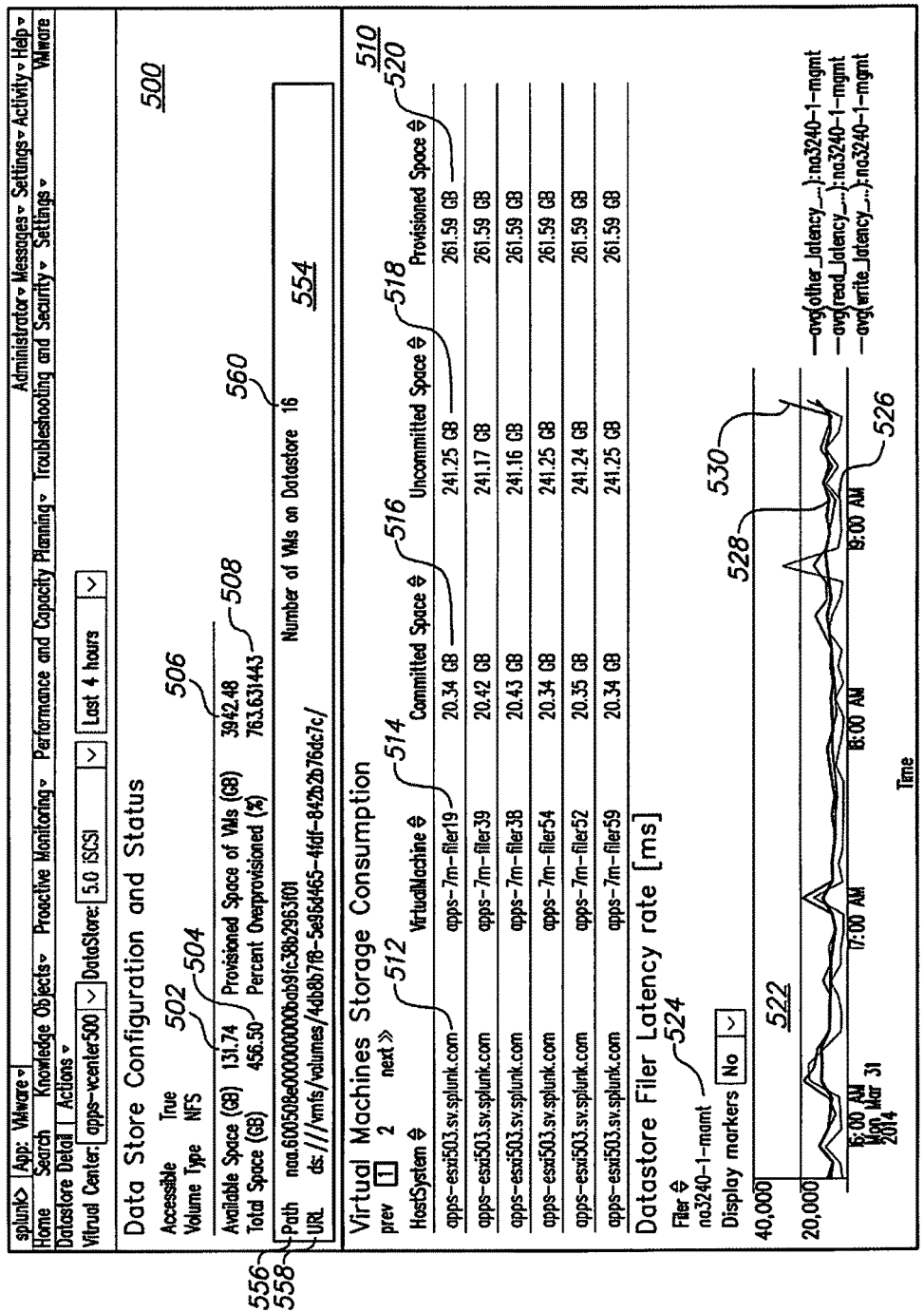
FIGS. 5A and 5B illustrate an example graphical interface that includes information about a particular volume.
Figure 5B:
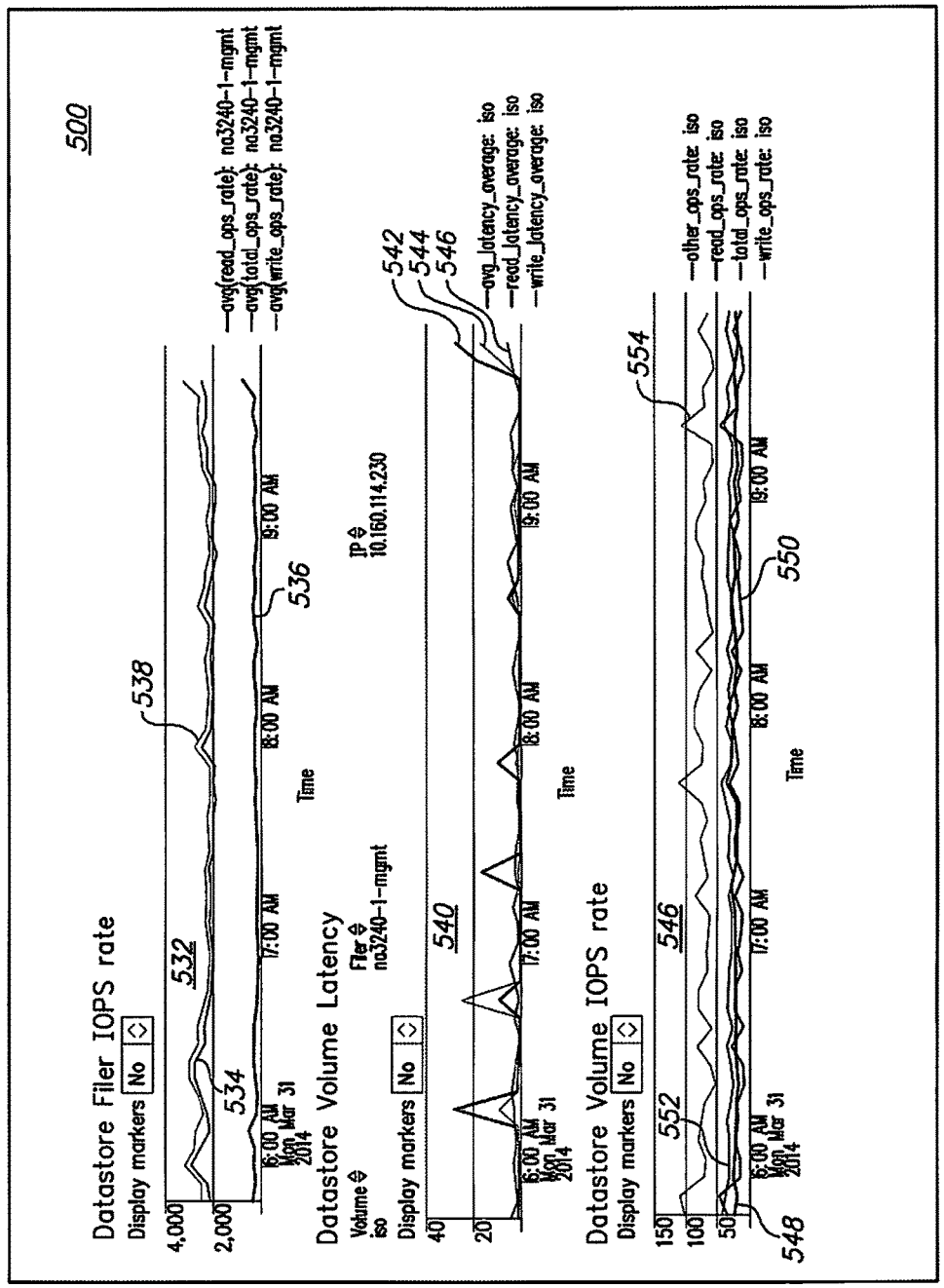

FIGS. 5A and 5B illustrate an example graphical interface that includes information about a particular volume. FIG. 5A illustrates one portion of the example graphical interface and FIG. 5B illustrates a second portion of the same example graphical interface. Interface 500 is an example general volume view that displays information relating to the selected volume.

In region 520, interface 500 identifies the amount of space available in the particular volume (item 502), the total space in the particular volume (item 504), the amount of space provisioned in the particular volume for virtual machines (item 506), and the percentage of the volume that is over-provisioned (item 508).

Region 554 identifies the path of the particular volume (item 556), the URL of the particular volume (item 558), and the number of virtual machines that utilize the particular volume (item 560).

Region 510 identifies, for each virtual machine using the particular volume, the name of the physical host of the virtual machine (item 512), the name of the virtual machine (item 514), the amount of space committed to the virtual machine (item 516), the amount of uncommitted space in the particular volume for the virtual machine(item 518), and the amount of space provisioned for the virtual machine (item 520).

Interface 500 displays various graphs indicating the performance of the particular volume and the storage controller that manages the particular volume. For example, graph 522 indicates the latency rate for the storage controller that manages the particular volume over the past four hours in milliseconds. Item 524 identifies the name of the storage controller that manages the particular volume. Line 526 indicates the average latency for write operations, line 528 indicates the average latency for read operations, and line 530 indicates the average latency for other operations.

In FIG. 5B, graph 532 indicates the average input/output operations performed per second (IOPS) by the storage controller that manage the particular volume over the past four hours. Line 534 indicates the average IOPS for write operations, line 536 indicates the average IOPS for read operations, and line 538 indicates the average IOPS for all operations.

Graph 540 indicates the latency rate for the particular volume over the past four hours in milliseconds. Line 542 indicates the average latency for write operations, line 544 indicates the average latency for read operations, and line 546 indicates the average latency for all operations.

Graph 546 indicates the average input/output operations performed per second (IOPS) by the storage controller that manage the particular volume over the past four hours. Line 548 indicates the average IOPS for write operations, line 550 indicates the average IOPS for read operations, line 552 indicates the average IOPS for other operations, and line 554 indicates the average IOPS for all operations.

In some embodiments, the information displayed in region 520 is determined based on virtual machine data records obtained from virtual machine manager 114 and the information displayed in regions 554 and 510 and graphs 522, 532, 540, and 546 is determined based on storage data records received from storage controller 130.

FIGS. 4, 5A, and 5B illustrate merely one example embodiment in which virtual machine information from virtual machine manager 114 may be displayed in association with storage data from storage controller 130. In other embodiments, virtual machine information from virtual machine manager 114 may be displayed in association with storage data from storage controller 130 in alternate ways. For example, in other embodiments, graphs indicating the performance of both a virtual machine and the storage entities associated with the virtual machine may be displayed within the same graphical interface.

Although the process of FIG. 3 is described as having been performed at VM data manager app 104, in other embodiments, the process of FIG. 3 may be performed at storage data manager app 106 or some other application. For example, storage data manager app 104 may cause display of graphical interfaces depicting both virtual machine information and storage information determined based on virtual machine data records and storage data records.

In response to a user selection to view further information about storage resources, further information about storage controller 130 may be displayed in a third graphical interface. The user may select item 524 in interface 500, which identifies the name of a storage controller 130. The third graphical interface, a detailed storage view, may be displayed in and by a separate application, such as storage data manager application 106. The third graphical interface may indicate performance metrics such as how the CPU of storage controller 130 is performing and how many input/output operations storage controller 130 is handling per second (IOPS).

The second and/or third graphical interface may also identify the physical disks that a particular volume spans. VM data manager app 104 or storage data manager app 106 app may determine which disks a volume spans based on storage data records in storage data repository 150.

Using the approaches described herein, a user may troubleshoot performance issues in a virtual machine more efficiently and easily than before. As one example, after noticing that a virtual machine is under-performing, a user may navigate to a virtual machine view (e.g., interface 400) to determine the status of the virtual machine. Based on the information displayed in the virtual machine view, the user may determine whether the performance issue is being caused by a resource of the physical host. For example, if none of the information in interface 400 indicates an existence of an issue with the resources of the physical host, the user may choose to view volume information by selecting the volume that contains the virtual machine's data (e.g., item 420 in interface 400). If the information in the volume view (e.g., interface 500) indicates poor performance or a sharp change in the performance of a volume or a storage controller, the user may determine that the virtual machine performance is indeed being affected by a problem in the storage environment. If so, a user may view further information about the storage environment, for example by selecting item 524, which identifies the name of the storage controller that manages the volume. Selecting item 524 may result in the display of a third interface, a detailed storage view, that provides details such as which disks a volume spans and what the performance statistics are for the storage controller that manages a particular volume (e.g., CPU utilization metrics). Based on the performance metrics displayed in the third interface, the user may determine which physical components may be causing the issue. For example, based on the second graphical interface, the user may determine whether it is a problem in the storage environment or elsewhere and, if it is a problem in the physical environment, based on the third graphical interface, the user may determine whether the problem is being caused by a particular disk, a particular storage controller, or some other storage entity.

According to various embodiments, one or more of the steps of the processes illustrated in FIGS. 2 and 3 may be removed or the ordering of the steps may be changed. Additionally, although separate embodiments are discussed herein, any combination of embodiments and/or partial embodiments discussed herein may be combined to form further embodiments.

In an embodiment, system 100 may be a distributed system where VM data collection node 110, data management system 112, storage data collection node 128, VM data repository 126, and storage data repository 150 each represent multiple entities in a distributed system. For example, VM data collection node 110 and storage data collection node 128 may each represent multiple data collection nodes that forward information from different virtual machine managers and different storage controllers, respectively, to different computers within data management system 102. Virtual machine data repository 126 and storage data repository 150 may each represent multiple, different repositories within which virtual machine data and storage data is stored. VM data manager app 104 and storage data manager app 106 may each execute on multiple machines and different instances of the apps may store information in different repositories.

In response to a request for information, such as a request to view information for a volume, records of all the different repositories that collectively represent virtual machine data repository 126 and storage data repository 150 may be searched. In some cases, they repositories may be searched by different search units on different machines. Records from the different repositories that collectively represent virtual machine data repository 126 and storage data repository 150 may be used to determine performance information for display in a single graphical interface.

Additionally, in other embodiments other performance metrics of virtual environment 152 and storage environment 148 may be identified in the graphical interface(s) or used to determine performance information that is identified in the graphical interface(s).

Metrics relating to virtual environment 152 may describe properties of the virtual environment, a particular virtual machine, a particular physical host, a particular virtual machine manage, and/or a particular virtual system manager. Performance metrics may include a CPU performance metric, a memory performance metric, a summary performance metric, a performance metric based on a max CPU usage, a performance metric based on a max memory usage, a performance metric based on a ballooned memory, a performance metric based on a swapped memory, a performance metric based on an average memory usage percentage, a performance metric based on the total amount of memory that is reclaimed from all of the VMs on a host, a performance metric based on the total amount of memory that is being swapped from all of the VMs on a host, a performance metric that changes state based on the remaining disk space on a data store, a performance metric that changes state based on how much space is over-provisioned (i.e., negative numbers are a representation of an under-provisioned data store), a performance metric based on a VM's average CPU usage in percent, a performance metric based on a VM's average memory usage in percent, a performance metric based on a VM's state waiting for CPU time, a performance metric based on a VM's memory that is actively in use, a performance metric based on a VM's memory saved by memory sharing, a performance metric based on a VM's memory used to power the VM, a performance metric based on physical memory that is mapped to a VM (i.e., memory not including overhead memory), a performance metric based on an amount of physical memory that is being reclaimed by a host through a ballooning driver, a performance metric based on memory that is being read by a VM from a host's swap file, a performance metric based on an amount of memory a VM has had to write to a swap file, a performance metric based on an amount of memory from a VM that has been swapped by a host. Other example metrics may include task assignment count, task assignment types, task completion counts, and/or may describe migrations to/from a virtual machine or to/from a host.

Included below is a non-exhaustive list of known virtual machine performance metrics relating to virtual environment 152 that may be identified in graphical interface(s) displayed by data management 102 or used to determine performance information that is identified in the graphical interface(s).

PercentHighCPUVm, PercentHighMemVm, PercentHighSumRdyVm, VMInvCpuMaxUsg, VMInvMemMax- Usg, PercentHighBalloonHosts, PercentHighSwapHosts, PercentHighCPUHosts, BalloonedMemory_MB, swappedMemory_MB, RemainingCapacity_GB, Overprovisioned_GB, p_average_cpu_usage_percent, p_average_mem_usage_percent, p_summation_cpu_ready_millisecond, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, 20 p_average_mem_swapin_kiloBytes, p_average_mem_swapout_kiloBytes, p_average_mem_swapped_kiloBytes, p_average_disk_read_kiloBytesPerSecond, p_average_disk_write_kiloBytesPerSecond, p_average_disk_usage_kiloBytesPerSecond, p_summation_disk_numberWrite_number, p_summation_disk_numberRead_number, p_latest_disk_maxTotalLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_usage_percent, p_summation_cpu_ready_millisecond, p_average_mem_usage_percent, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_llSwapUsed_kiloBytes, p_average_disk_numberReadAveraged_number, p_average_disk_numberWriteAveraged_number, p_average_disk_usage_kiloBytesPerSecond, p_summation_disk_numberWrite_number, _summation_disk_numberRead_number, p_latest_disk_maxTotalLatency_millisecond, p_average_disk_queueLatency_millisecond, p_summation_disk_commandsAborted_number, p_summation_d5isk_busResets_number, p_average_net_received_kiloBytesPerSecond, p_average_net_transmitted_kiloBytesPerSecond, p_average_net_usage_kiloBytesPerSecond, p_average_cpu_demand_megaHertz, p_average_cpu_demand_megaHertz, p_average_cpu_usagemhz_megaHertz, p_average_cpu_usagemhz_megaHertz and/or AvgUsg_pctPercentHighCPUVm, PercentHighMemVm, PercentHighSumRdyVm, VMInvCpuMaxUsg, VMInvMemMaxUsg, PercentHighBalloonHosts, PercentHighSwapHosts, PercentHighCPUHosts, BalloonedMemory_MB, swappedMemory_MB, RemainingCapacity_GB, Overprovisioned_GB, p_average_cpu_usage_percent, p_average_mem_usage_percent, p_summation_cpu_ready_millisecond, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_swapped_kiloBytes, p_average_disk_read_kiloBytesPerSecond, p_average_disk_write_kiloBytesPerSecond, p_average_disk_usage_kiloBytesPerSecond, p_summation_disk_numberWrite_number, p_summation_disk_numberRead_number, p_latest_disk_maxTotalLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_usage_percent, p_summation_cpu_ready_millisecond, p_average_mem_usage_percent, p_average_mem_active_kiloBytes, p_average_mem_consumed_kiloBytes, p_average_mem_overhead_kiloBytes, p_average_mem_granted_kiloBytes, p_average_mem_vmmemctl_kiloBytes, p_average_mem_swapin_kiloBytes, p_average_mem_swapout_kiloBytes, p_average_mem_llSwapUsed_kiloBytes, p_average_disk_numberReadAveraged_number, p_average_disk_numberWriteAveraged_number, p_average_disk_usage_kiloBytesPerSecond, p_summation_disk_numberWrite_number, p_summation_disk_numberRead_number, p_latest_disk_maxTotalLatency_millisecond, p_average_disk_queueLatency_millisecond, p_summation_disk_commandsAborted_number, p_summation_disk_busResets_number, p_average_net_received_kiloBytesPerSecond, p_average_net_transmitted_kiloBytesPerSecond, p_average_net_usage_kiloBytesPerSecond, p_average_cpu_demand_megaHertz, p_average_cpu_demand_5 megaHertz, p_average_cpu_usagemhz_megaHertz, p_average_cpu_usagemhz_megaHertz and/or AvgUsg_pct.

Of course any of the above or below listed performance metrics could also or alternatively be monitored and reported in any of: bytes, MegaBytes, GigaBytes and/or any other byte or memory amount.

Any performance metrics described herein could also or alternatively be monitored and reported in any of: hertz, MegaHertz, GigaHertz and/or any hertz amount. Moreover, any of the performance metrics disclosed herein may be monitored and reported in any of percentage, relative, and/or absolute values.

Other performance metrics that may be collected or displayed may include any type of cluster performance metrics, such as: latest_clusterServices_cpufairness_number, average_clusterServices_effectivecpu_megaHertz, average_clusterServices_effectivemem_megaBytes, latest_clusterServices_failover_number and/or latest_clusterServices_memfairness_number.

CPU performance metrics that may be collected or displayed may include any of: average_cpu_capacity.contention_percent, average_cpu_capacity.demand_megaHertz, average_cpu_capacity.entitlement_megaHertz, average_cpu_capacity.provisioned_megaHertz, average_cpu_capacity.usage_megaHertz, none_cpu_coreUtilization_percent, average_cpu_coreUtilization_percent, maximum_cpu_coreUtilization_percent, minimum_cpu_coreUtilization_percent, average_cpu_corecount.contention_percent, average_cpu_corecount.provisioned_number, average_cpu_corecount.usage_number, summation_cpu_costop_millisecond, latest_cpu_cpuentitlement_megaHertz, average_cpu_demand_megaHertz, latest_cpu_entitlement_megaHertz, summation_cpu_idle_millisecond, average_cpu_latency_percent, summation_cpu_maxlimited_millisecond, summation_cpu_overlap_millisecond, summation_cpu_ready_millisecond, average_cpu_reservedCapacity_megaHertz, summation_cpu_run_millisecond, summation_cpu_swapwait_millisecond, summation_cpu_system_millisecond, average_cpu_totalCapacity_megaHertz, average_cpu_totalmhz_megaHertz, none_cpu_us5age_percent, average_cpu_usage_percent, minimum_cpu_usage_percent, maximum_cpu_usage_percent, none_cpu_usagemhz_megaHertz, average_cpu_usagemhz_megaHertz, minimum_cpu_usagemhz_megaHertz, maximum_cpu_usagemhz_megaHertz, summation_cpu_used_millisecond, none_cpu_utilization_percent, average_cpu_utilization_percent, maximum_cpu_utilization_percent, minimum_cpu_utilization_percent and/or summation_cpu_wait_millisecond.

Host-based replication ("hbr") performance metrics that may be collected or displayed may include any of: average_hbr_hbrNetRx_kiloBytesPerSecond, average_hbr_hbrNetTx_kiloBytesPerSecond and/or average_hbr_hbrNumVms_number.

Management Agent performance metrics that may be collected or displayed may include any of: average_managementAgent_5 cpuUsage_megaHertz, average_managementAgent_memUsed_kiloBytes, average_managementAgent_swapIn_kiloBytesPerSecond, average_managementAgent_swapOut_kiloBytesPerSecond and/or average_managementAgent_swapUsed_kiloBytes.

Memory performance metrics that may be collected or displayed may include any of:

none_mem_active_kiloBytes, average_mem_active_kiloBytes, minimum_mem_active_kiloBytes, maximum_mem_active_kiloBytes, average_mem_activewrite_kiloBytes, average_mem_capacity.contention_percent, average_mem_capacity.entitlement_kiloBytes, average_mem_capacity.provisioned_kiloBytes, average_mem_capacity.usable_kiloBytes, average_mem_capacity.usage_kiloBytes, average_mem_capacity.usage.userworld_kiloBytes, average_mem_capacity.usage.vm_kiloBytes, average_mem_capacity.usage.vmOvrhd_kiloBytes, average_mem_capacity.usage.vmkOvrhd_kiloBytes, average_mem_compressed_kiloBytes, average_mem_compressionRate_kiloBytesPerSecond, none_mem_consumed_kiloBytes, average_mem_consumed_kiloBytes, minimum_mem_consumed_kiloBytes, maximum_mem_consumed_kiloBytes, average_mem_consumed.userworlds_kiloBytes, average_mem_consumed.vms_kiloBytes, average_mem_decompressionRate_kiloBytesPerSecond, average_mem_entitlement_kiloBytes, none_mem_granted_kiloBytes, average_mem_granted_kiloBytes, minimum_mem_granted_kiloBytes, maximum_mem_granted_kiloBytes, none_mem_heap_kiloBytes, average_mem_heap_kiloBytes, minimum_mem_heap_kiloBytes, maximum_mem_heap_kiloBytes, none_mem_heapfree_kiloBytes, average_mem_heapfree_kiloBytes, minimum_mem_heapfree_kiloBytes, maximum_mem_heapfree_kiloBytes, average_mem_latency_percent, none_mem_llSwapIn_kiloBytes, average_mem_llSwapIn_kiloBytes, maximum_mem_llSwapIn_kiloBytes, minimum_mem_llSwapIn_kiloBytes, average_mem_llSwapInRate_kiloBytesPerSecond, none_mem_llSwapOut_kiloBytes, average_mem_llSwapOut_kiloBytes, maximum_mem_llSwapOut_kiloBytes, minimum_mem_llSwapOut_kiloBytes, average_mem_llSwapOutRate_kiloBytesPerSecond, none_mem_llSwapUsed_kiloBytes, average_mem_llSwapUsed_kiloBytes, maximum_mem_llSwapUsed_kiloBytes, minimum_mem_llSwapUsed_kiloBytes, average_mem_lowfreethreshold_kiloBytes, latest_mem_mementitlement_megaBytes, none_mem_overhead_kiloBytes, average_mem_overhead_kiloBytes, minimum_mem_overhead_kiloBytes, maximum_mem_overhead_kiloBytes, average_mem_overheadMax_kiloBytes, average_mem_overheadTouched_kiloBytes, average_mem_reservedCapacity_megaBytes, average_mem_reservedCapacity.userworld_kiloBytes, average_mem_reservedCapacity.vm_kiloBytes, average_mem_reservedCapacity.vmOvhd_kiloBytes, average_mem_reservedCapacity.vmkOvrhd_kiloBytes, average_mem_reservedCapacityPct_percent, none_mem_shared_kiloBytes, average_mem_shared_kiloBytes, minimum_mem_shared_kiloBytes, maximum_mem_shared_kiloBytes, none_mem_sharedcommon_kiloBytes, average_mem_sharedcommon_kiloBytes, minimum_mem_sharedcommon_kiloBytes, maximum_mem_sharedcommon_kiloBytes, latest_mem_state_number, none_mem_swapIn_kiloBytes, average_mem_swapIn_kiloBytes, minimum_mem_swapIn_kiloBytes, maximum_mem_swapIn_kiloBytes, none_mem_swapOut_kiloBytes, average_mem_swapOut_kiloBytes, minimum_mem_swapOut_kiloBytes, maximum_mem_swapOut_kiloBytes, none_mem_swapin_kiloBytes, average_mem_swapin_kiloBytes, maximum_mem_swapin_kiloBytes, minimum_mem_swapin_kiloBytes, average_mem_swapinRate_kiloBytesPerSecond, none_mem_swapout_kiloBytes, average_mem_swapout_kiloBytes, maximum_mem_swapout_kiloBytes, minimum_mem_swapout_kiloBytes, average_mem_swapoutRate_kiloBytesPerSecond, none_mem_swapped_kiloBytes, average_mem_swapped_kiloBytes, minimum_mem_swapped_kiloBytes, maximum_mem_swapped_kiloBytes, none_mem_swaptarget_kiloBytes, average_mem_swaptarget_kiloBytes, minimum_mem_swaptarget_kiloBytes, maximum_mem_swaptarget_kiloBytes, none_mem_swapunreserved_kiloBytes, average_mem_swapunreserved_kiloBytes, minimum_mem_swapunreserved_kiloBytes, maximum_mem_swapunreserved_5 kiloBytes, none_mem_swapused_kiloBytes, average_mem_swapused_kiloBytes, minimum_mem_swapused_kiloBytes, maximum_mem_swapused_kiloBytes, none_mem_sysUsage_kiloBytes, average_mem_sysUsage_kiloBytes, maximum_mem_sysUsage_kiloBytes, minimum_mem_sysUsage_kiloBytes, average_mem_totalCapacity_megaBytes, average_mem_totalmb_megaBytes, none_mem_unreserved_kiloBytes, average_mem_unreserved_kiloBytes, minimum_mem_unreserved_kiloBytes, maximum_mem_unreserved_kiloBytes, none_mem_usage_percent, average_mem_usage_percent, minimum_mem_usage_percent, maximum_mem_usage_percent, none_mem_vmmemctl_kiloBytes, average_mem_vmmemctl_kiloBytes, minimum_mem_vmmemctl_kiloBytes, maximum_mem_vmmemctl_kiloBytes, none_mem_vmmemctltarget_kiloBytes, average_mem_vmmemctltarget_kiloBytes, minimum_mem_vmmemctltarget_kiloBytes, maximum_mem_vmmemctltarget_kiloBytes, none_mem_zero_kiloBytes, average_mem_zero_kiloBytes, minimum_mem_zero_kiloBytes, maximum_mem_zero_kiloBytes, latest_mem_zipSaved_kiloBytes and/or latest_mem_zipped_kiloBytes.

Network performance metrics that may be collected or displayed may include any of: summation_net_broadcastRx_number, summation_net_broadcastTx_number, average_net_bytesRx_kiloBytesPerSecond, average_net_bytesTx_kiloBytesPerSecond, summation_net_droppedRx_number, summation_net_droppedTx_number, summation_net_errorsRx_number, summation_net_errorsTx_number, summation_net_multicastRx_number, summation_net_multicastTx_number, summation_net_packetsRx_number, summation_net_packetsTx_number, average_net_received_kiloBytesPerSecond, summation_net_throughput.contention_number, average_net_throughput.packetsPerSec_number, average_net_throughput.provisioned_kiloBytesPerSecond, average_net_throughput.usable_kiloBytesPerSecond, average_net_throughput.usage_kiloBytesPerSecond, average_net_throughput.usage.ft_kiloBytesPerSecond, average_net_throughput.usage, hbr_kiloBytesPerSecond, average_net_throughput.usage.iscsi_kiloBytesPerSecond, average_net_throughput.usage.nfs_kiloBytesPerSecond, average_net_throughput.usage.vm_kiloBytesPerSecond, average_net_throughput.usage.vmotion_kiloBytesPerSecond, average_net_transmitted_kiloBytesPerSecond, summation_net_unknownProtos_number, none_net_usage_kiloBytesPerSecond, average_net_usage_kiloBytesPerSecond, minimum_net_usage_kiloBytesPerSecond and/or maximum_net_usage_kiloBytesPerSecond.

Power performance metrics that may be collected or displayed may include any of: average_power_capacity.usable_watt, average_power_capacity.usage_watt, average_power_capacity.usagePct_percent, summation_power_energy_joule, average_power_power_watt and/or average_power_powerCap_watt.

Rescpu performance metrics that may be collected or displayed may include any of: latest_rescpu_actav1_percent, latest_rescpu_actav15_percent, latest_rescpu_actav5_percent, latest_rescpu_actpk1_percent, latest_rescpu_actpk15_percent, latest_rescpu_actpk5_percent, latest_rescpu_maxLimited1_percent, latest_rescpu_maxLimited15_percent, latest_rescpu_maxLimited5_percent, latest_rescpu_runav1_percent, latest_rescpu_runav15_percent, latest_rescpu_runav5_percent, latest_rescpu_runpk1_percent, 25 latest_rescpu_runpk15_percent, latest_rescpu_runpk5_percent, latest_rescpu_sample, count_number and/or latest_rescpu_samplePeriod_millisecond.

System performance metrics that may be collected or displayed may include any of: latest_sys_diskUsage_percent, summation_sys_heartbeat_number, latest_sys_osUptime_second, latest_sys_resourceCpuAct1_percent, latest_sys_resourceCpuAct5_percent, latest_sys_resourceCpuAllocMax_megaHertz, latest_sys_resourceCpuAllocMin_megaHertz, latest_sys_resourceCpuAllocShares_number, latest_sys_resourceCpuMaxLimited1_percent, latest_sys_resourceCpuMaxLimited5_percent, latest_sys_resourceCpuRun1_percent, latest_sys_resourceCpuRun5_percent, none_sys_resourceCpuUsage_megaHertz, average_sys_resourceCpuUsage_megaHertz, maximum_5 sys_resourceCpuUsage_megaHertz, minimum_sys_resourceCpuUsage_megaHertz, latest_sys_resourceMemAllocMax_kiloBytes, latest_sys_resourceMemAllocMin_kiloBytes, latest_sys_resourceMemAllocShares_number, latest_sys_resourceMemConsumed_kiloBytes, latest_sys_resourceMemCow_kiloBytes, latest_sys_resourceMemMapped_kiloBytes, latest_sys_resourceMemOverhead_kiloBytes, latest_sys_resourceMemShared_kiloBytes, latest_sys_resourceMemSwapped_kiloBytes, latest_sys_resourceMemTouched_kiloBytes, latest_sys_resourceMemZero_kiloBytes and/or latest_sys_uptime_second.

Debug performance metrics that may be collected or displayed may include any of: maximum_vcDebugInfo_activationlatencystats_millisecond, minimum_vcDebugInfo_activationlatencystats_millisecond, summation_vcDebugInfo_activationlatencystats_millisecond, maximum_vcDebugInfo_activationstats_number, minimum_vcDebugInfo_activationstats_number, summation_vcDebugInfo_activationstats_number, maximum_vcDebugInfo_hostsynclatencystats_millisecond, minimum_vcDebugInfo_hostsynclatencystats_millisecond, summation_vcDebugInfo_hostsynclatencystats_millisecond, maximum_vcDebugInfo_hostsyncstats_number, minimum_vcDebugInfo_hostsyncstats_number, summation_vcDebugInfo_hostsyncstats_number, maximum_vcDebugInfo_inventorystats_number, minimum_vcDebugInfo_inventorystats_number, summation_vcDebugInfo_inventorystats_number, maximum_vcDebugInfo_lockstats_number, minimum_vcDebugInfo_lockstats_number, summation_vcDebugInfo_lockstats_number, maximum_vcDebugInfo_lrostats_number, minimum_vcDebugInfo_lrostats_number, summation_vcDebugInfo_lrostats_number, maximum_vcDebugInfo_miscstats_number, minimum_vcDebugInfo_miscstats_number, summation_vcDebugInfo_miscstats_number, maximum_vcDebugInfo_morefregstats_number, minimum_vcDebugInfo_morefregstats_number, summation_vcDebugInfo_morefregstats_number, maximum_vcDebugInfo_scoreboard_number, minimum_vcDebugInfo_scoreboard_number, summation_vcDebugInfo_5 scoreboard_number, maximum_vcDebugInfo_sessionstats_number, minimum_vcDebugInfo_sessionstats_number, summation_vcDebugInfo_sessionstats_number, maximum_vcDebugInfo_systemstats_number, minimum_vcDebugInfo_systemstats_number, summation_vcDebugInfo_systemstats_number, maximum_vcDebugInfo_vcservicestats_number, minimum_vcDebugInfo_vcservicestats_number and/or summation_vcDebugInfo_vcservicestats_number.

Resource performance metrics that may be collected or displayed may include any of: average_vcResources_cpuqueuelength_number, average_vcResources_ctxswitchesrate_number, average_vcResources_diskqueuelength_number, average_vcResources_diskreadbytesrate_number, average_vcResources_diskreadsrate_number, average_vcResources_diskwritebytesrate_number, average_vcResources_diskwritesrate_number, average_vcResources_netqueuelength_number, average_vcResources_packetrate_number, average_vcResources_packetrecvrate_number, average_vcResources_packetsentrate_number, average_vcResources_pagefaultrate_number, average_vcResources_physicalmemusage_kiloBytes, average_vcResources_poolnonpagedbytes_kiloBytes, average_vcResources_poolpagedbytes_kiloBytes, average_vcResources_priviledgedcpuusage_percent, average_vcResources_processcpuusage_percent, average_vcResources_processhandles_number, average_vcResources_processthreads_number, average_vcResources_syscallsrate_number, average_vcResources_systemcpuusage_percent, average_vcResources_systemnetusage_percent, average_vcResources_systemthreads_number, average_vcResources_usercpuusage_percent and/or average_vcResources_virtualmemusage_kiloBytes.

VM operation performance metrics that may be collected or displayed may include any of: latest_vmop_numChangeDS_number, latest_vmop_numChangeHost_number, latest_vmop_numChangeHostDS_number, latest_vmop_numClone_number, latest_vmop_numCreate_number, latest_vmop_numDeploy_number, latest_vmop_numDestroy_number, latest_vmop_numPoweroff_number, latest_vmop_numPoweron_number, latest_vmop_numRebootGuest_number, latest_vmop_numReconfigure_number, latest_vmop_numRegister_number, latest_vmop_numReset_number, latest_vmop_numSVMotion_number, latest_vmop_numShutdownGuest_number, latest_vmop_numStandbyGuest_number, latest_vmop_numSuspend_number, latest_vmop_numUnregister_number and/or latest_vmop_numVMotion_number.

Included below is a non-exhaustive list of known performance metrics relating to storage environment 148 that may be identified in the graphical interface(s) displayed by data management system 102 or used to determine performance information that is identified in the graphical interface(s).

VOLUME PERF METRICS: other_ops_rate, other_latency_average, avg_latency_average, write_latency_average, read_ops_rate, write_ops_rate, read_latency_average, total_ops_rate, cifs_write_ops, wvblk_past_eof, cifs_read_latency, cifs_read_ops, clone_blks_copied, nfs_write_ops_rate, process_name, repl_metafile_logical_xfer_dw_indirect_blks_cnt, clone_read_redirected, clone_num_share_stopped, wvblk_rsrv_parent_overwrite_always, nfs_protocol_write_latency_labels, delete_log_labels, nfs_protocol_read_latency_delta, san_other_ops, bad_zombie_ind_blk_read_err_not_propagated, write_data_rate, wvsblk_vvrd_spcflags, iscsi_read_ops_rate, fcp_protocol_read_latency_labels, df_worker_rate, wvblk_snap_reserve, bad_container_user_blk_read_error_propagated, san_read_latency_average, clone_afs_sub_file, msgs_allowed_in_nv-failed_state, wv_fsinfo_blks_vbn_zero_in_plane0, iscsi_protocol_read_latency, wv_playlist_no_raidbufs, iscsi_protocol_write_latency_labels, nfs_read_latency_average, iscsi_write_data_rate, clone_snap_full_file, other_latency, cifs_other_latency_average, fcp_protocol_other_latency, wvbd_whole_frees_o,flexcache_send_data, wv_playlist_entries, clone_inline_split_source_destination_dirty, write_data, wvblk_reclaim_time_done, nfs_write_data, wv_fsinfo_blks_used, wvblk_saved_fsinfo_private_inos_total, total_protocol_other_latency_delta, wv_fsinfo_fs_version, sub_clone_latencies_hist , , , nfs_read_latency, asynchronous_frees, iscsi_read_latency, clone_split_ra, repl_metafile_logical_xfer_buffer_blks_cnt, clone_inline_split_beyond_eof, wvsblk_lev0_over_nominal, wv_playlist_not_present, wvbd_active_frees, wv_fsinfo_blks_reserve, cifs_protocol_other_latency_labels, cad_iron_fixed, bad_fixable_blk_read_error_not_propagated, wv_playlist_apfi_collision_accesses, fcp_write_ops, bad_container_fixable_snap_blk_read_error_propagated, iscsi_protocol_read_latency_delta, wv_vol_type, clone_sizes_hist_labels, wvzmb_num_zmsgs_inuse, wvblk_rsrv_holes_cifs64, total_protocol_write_latency, sub_clone_latencies_hist_labels, flexcache_receive_data_rate, nfs_other_latency, cifs_read_data_rate, nfs_protocol_other_latency_labels, wv_playlist_prefetch_end_time, nfs_read_ops_rate, total_protocol_write_latency_labels, wvblk_rsrv_parent_holes, cifs_read_ops_rate, wv_playlist_prefetch_not_started, wv_fsinfo_blks_used_by_plane0, internal_msgs_rate, wv_playlist_load_end_time, read_ops, wv_fsinfo_blkr_cp, wv_fsinfo_blks64_blks_rsrv_holes_cifs, clone_inline_split_source_spec_vbn, wvblk_rsrv_overwrite, wv_playlist_misses, bad_container_fixable_snap_blk_read_error_not_propagated, nfs_protocol_read_latency_labels, clone_lookups, node_name, total_protocol_read_latency_labels, wv_fsinfo_blks_blks_rsrv_overwrite, wv_playlist_cont_indirects, wvi2p_wip_wi_size, wvdf enabled, iscsi_other_latency, bad_fixable_metafile_blk_read_error_not_propagated, wvblk_reclaim_time_reset, san_write_data, cifs_write_latency, clone_prune_tmpclonedir_err, delete_log, wvsblk_vvrd_spc_clone_inherited, nfs_protocol_other_latency_delta, write_ops, wvblk_saved_fsinfo_public_inos_reserve, wv_fsinfo_blks_vvol_dbys_df_cnt, write_blocks_rate, wv_fsinfo_blks_total, wvbd_owner_changed_y, cifs_protocol_read_latency, flexcache_other_ops_rate, fcp_other_ops, fcp_protocol_other_latency_delta, wvip_vvol_container_wi_blk_cnt, wv_playlist_apfi_collision_inserts, wv_playlist_prefetch_start_time, iscsi_read_data, extent_size, instance_name, iscsi_write_latency_average, wv_fsinfo_containment_version_vmalign, bad_container_user_blk_read_error_not_propagated, iscsi_write_data, nfs_read_ops, parent_aggr, san_read_ops, cad_clone_create_inserts, cifs_protocol_write_latency_delta, wvblk_rsrv_parent_overwrite, iscsi_read_ops, wv_fsinfo_public_inos_total, iscsi_write_ops_rate, iscsi_read_data_rate, bad_container_non_fixable_blk_read_error_propagated, wvblk_spcres_in_parent, wvblk_rsrv_holes64, nfs_write_latency_average, wvsblk_vvrd_last_fbn, wvblk_saved_fsinfo_private_inos_used, fcp_read_data_rate, nfs_read_data_rate, cifs_protocol_other_latency_delta, clone_split_ra_lag, stream_sizes_hist_labels, synchronous_frees_rate, bad_container_non_fixable_blk_read_error_not_propagated, wv_fsinfo_blks_blks_rsrv_holes, cad_cli_deletes, clone_e-io_blks, fcp_write_data, fcp_protocol_write_latency, flexcache_send_data_rate, flexcache_read_data_rate, nfs_protocol_write_latency_delta, wvblk_zombie_blks, asynchronous_frees_rate, wvblk_rsrv_holes_cifs, wvblk_saved_fsinfo_public_inos_total, wv_fsinfo_blks64_blks_rsrv_holes, cifs_other_ops_rate, cifs_protocol_read_latency_labels, bad_container_fixable_afs_blk_read_error_not_propagated, flexcache_read_ops_rate, clone_max_streams, san_write_latency, san_write_ops, wv_fsinfo_blks_res_state, wv_fsinfo_containment_version_highest_compression, nfs_write_data_rate, other_ops, cifs_write_data_rate, wvdf_last_fbn, iscsi_other_latency_average, fcp_read_latency, fcp_write_latency, san_read_latency, bad_ non_fixable_blk_read_error_not_propagated, wvblk_saved_fsinfo_private_inos_reserve, wv_fsinfo_containment_version_spare1, wv_fsinfo_containment_version_spare2, full_clone_latencies_hist, wvdf max_frees, san_read_data, nfs_protocol_read_latency, wv_playlist_vvbn_holes, clone_sizes_hist, san_write_ops_rate, nfs_other_ops_rate, wvsblk_vvrd_vol_size, wvblk_saved_fsinfo_public_inos_used, iscsi_protocol_other_latency_delta, wvblk_rsrv_holes, cifs_protocol_write_latency_labels, iscsi_other_ops, wvol_number_suspended_rate, clone_inline_split_range_size_limitation, wvsnap_incore_count, cifs_other_ops, clone_inline_split_enospc, fcp_write_ops_rate, clone_snap_sub_file, clone_num_entries, total_protocol_other_latency_labels, wv_fsinfo_blks_rsrv_absents, san_write_latency_average, iscsi_protocol_write_latency_delta, synchronous_frees, wvblk_reclaim_time_start, total_protocol_read_latency_delta, cifs_protocol_write_latency, wvblk_delalloc, clone_afs_full_file, clone_inodes, wv_fsinfo_containment_version_highest_slc, fcp_protocol_other_latency_labels, wv_fsid, wv_fsinfo_containment_version_highest_sle, wv_fsinfo_public_inos_used, vserver_name, nfs_write_latency, san_read_data_rate, full_clone_latencies_hist_labels, fcp_other_latency, cad_cli_updates, clone_max_entries, san_read_ops_rate, wvip_public_inofile_wi_blk_cnt, wv_fsinfo_private_inos_reserve, fcp_write_latency_average, wvip_vvol_container_wi_size, wv_fsinfo_blks_rsrv_parent, san_other_latency_average, wvdf_inconsistent_scores, bad_user_blk_read_error_propagated, cad_cli_inserts, flexcache_receive_data, clone_storage_blocks, wvbd_active_frees_y, cifs_read_data, cifs_write_ops_rate, wvblk_rsrv_absents, wvip_vvol_container_indirects, total_protocol_write_latency_delta, wv_playlist_hits, wvip_private_inofile_wi_blk_cnt, wvblk_past_eof64, fcp_protocol_write_latency_labels, flexcache_write_ops_rate, iscsi_protocol_other_latency, bad_fixable_metafile_blk_read_error_propagated, nfs_read_data, bad_user_blk_read_error_not_propagated, iscsi_other_ops_rate, fcp_protocol_read_latency, san_other_latency, read_data_rate, total_protocol_read_latency, total_protocol_other_latency, instance_uuid, fcp_other_ops_rate, cifs_write_data, cifs_protocol_read_latency_delta, internal_msgs, node_uuid, flexcache_write_data, read_blocks, wv_fsinfo_containment_version_compression, nfs_other_ops, fcp_read_latency_average, nfs_protocol_write_latency, flexcache_read_data, clone_streams_efbig, iscsi_write_ops, clone_lookup_hits, nonzero_dbys_cnt, bad_fixable_blk_read_error_propagated, write_blocks, fcp_read_data, iscsi_write_latency, bad_zombie_ind_blk_read_err_propagated, write_latency, wv_volinfo_fs_options, read_blocks_rate, df_worker, wv_fsinfo_containment_version_highest_spare2, wv_fsinfo_containment_version_highest_spare1, fcp_read_ops_rate, fcp_other_latency_average, wv_playlist_reqs, wv_fsinfo_containment_version_highest_vmalign, nfs_protocol_other_latency, wv_fsinfo_blks_overwrite_slider_pct, cifs_protocol_other_latency, wv_fsinfo_blks_snap_reserve_pct, iscsi_read_latency_average, iscsi_protocol_read_latency_labels, wv_fsinfo_containment_version_slc, wv_fsinfo_containment_version_sle, wv_fsinfo_private_inos_used, nfs_write_ops, iscsi_protocol_write_latency, wvsnap_ondisk_count, nfs_other_latency_average, repl_metafile_logical_xfer_checker_blks_cnt, clone_inline_split_edquot, wv_playlist_getbuf_failures, wvsblk_space_tax, read_latency, wv_fsinfo_private_inos_total, san_write_data_rate, wvbd_whole_frees, stream_sizes_hist, cifs_read_latency_average, flexcache_other_ops, flexcache_write_ops, wvdf_total_score, iscsi_protocol_other_latency_labels, wv_volinfo_fs_flags, cifs_other_latency, msgs_rejected_in_nvfailed_state, fcp_protocol_read_latency_delta, wv_fsinfo_blks_blks_rsrv_holes_cifs, wv_playlist_apfi_used_slots, cad_iron_removed, read_data, wvol_number_suspended, fcp_write_data_rate, wvdf_watermark, cifs_write_latency_average, clone_inline_split_kireeti_in_progress, clone_max_hierarchy, wv_fsinfo_public_inos_reserve, cad_crtime_updates, clone_inline_splits, vserver_uuid, wvblk_reclaim_time_abort, fcp_read_ops, wvsnap_loaded_total, flexcache_read_ops, flexcache_write_data_rate, wvblk_parent_to_be_reclaimed, total_ops, avg_latency, bad_non_fixable_blk_read_error_propagated, clone_unsplit_snap_entries, wvsblk_vvrd_flags, repl_metafile_logical_xfer_rebuild_buffer_blks_cnt, fcp_protocol_write_latency_delta, bad_container_fixable_afs_blk_read_error_propagated, san_other_ops_rate.

SYSTEM PERFORMANCE METRICS: write_ops_rate, total_ops_rate, read_ops_rate, sys_latency_hist_delta, node_name, fcp_data_sent, avg_processor_busy_percent, system_id, iscsi_ops, disk_data_read, cpu_busy, sys_latency_hist_labels, hdd_data_read_rate, num_processors, http_ops_rate, sys_read_latency_hist_labels, sys_read_latency_average, sys_avg_latency, hdd_data_written, nfs_ops, sys_write_latency_hist_labels, wafliron_delta, net_data_sent_rate, sys_avg_latency_average, hdd_data_written_rate, instance_uuid, nfs_ops_rate, fcp_data_recv, total_processor_busy, disk_data_written_rate, ssd_data_read, net_data_sent, fcp_data_recv_rate, cifs_ops_rate, ssd_data_written, total_ops, sys_latency_hist, fcp_data_sent_rate, hdd_data_read, disk_data_read_rate, sys_read_latency_hist, wafliron, http_ops, system_model, sys_write_latency_average, net_data_recv_rate, sys_read_latency, total_processor_busy_percent, wafliron_labels, node_uuid, serial_no, sys_write_latency, hostname, iscsi_ops_rate, cifs_ops, net_data_recv, instance_name, sys_write_latency_hist, fcp_ops, disk_data_written, cpu_elapsed_time, process_name, fcp_ops_rate, ssd_data_read_rate, avg_processor_busy, sys_write_latency_hist_delta, sys_read_latency_hist_delta, ontap_version, cpu_elapsed_time1, write_ops, cpu_elapsed_time2, read_ops, cpu_busy_percent, ssd_data_written_rate, uptime.

VFILER PERF METRICS: vfiler_read_ops, node_name, vfiler_write_ops, vfiler_net_data_sent, vfiler_misc_ops, vfiler_read_bytes_rate, vfiler_net_data_sent_rate, vfiler_net_data_recv_rate, vfiler_misc_ops_rate, vfiler_cpu_busy_percent, vfiler_cpu_busy_base, instance_uuid, vfiler_cpu_busy, vfiler_net_data_recv, vfiler_read_bytes, vfiler_write_ops_rate, node_uuid, vfiler_write_bytes, instance_name, vfiler_write_bytes_rate, process_name, vfiler_read_ops_rate.

QTREE PERF METRICS: parent_vol, internal_ops_rate, nfs_ops_rate, cifs_ops_rate, internal_ops, nfs_ops, cifs_ops, objname.

QUOTA PERF METRICS:, node_name, quota_lookups_labels, quota_name_db_blocks, quota_lookups, quota_db_blocks, quota_bplus_tree_blocks, instance_name, quota_disk_records_labels, instance_uuid, quota_types_labels, quota_records, node_uuid, quota_disk_records, quota_records_labels, quota_usermap_lookups_labels, process_name, quota_fsi_state, quota_types, quota_usermap_lookups, quota_state.

AGGREGATE PERF METRICS: blkr_async_no_msg_delta, cp_reads_hdd_rate, wvblk_saved_private_fsinfo_inos_total, wvblk_rsrv_overwrite, wv_fsinfo_containment_version_compression, blkr_blocks_redirected_reread_delta, blkr_wa_used_csc_aa_delta, blkr_redirect_blocks_ok_delta, blkr_wa_used_csc_aa, blkr_free_blocks_scanned_delta, blkr_blocks_redirected_noio_delta, blkr_segments_scanned_delta, wv_fsinfo_containment_version_spare1, wv_fsinfo_containment_version_spare2, user_write_blocks_hdd_rate, wvdf_max_frees, cp_reads_rate, blkr_redirect_demand_rereq, blkr_redirect_indirects_inspected_labels, blkr_blocks_redirected_nol1_delta, wvblk_child_delalloc, total_transfers_rate, blkr_full_segments_scanned_delta, wvblk_child_pledge_percent, blkr_rejected_segments_in_current_aa_delta, wvblk_saved_public_fsinfo_inos_used, total_transfers, wvblk_rsrv_child_holes, blkr_non_csc_used_empty_delta, total_transfers_hdd, blkr_csc_empty_aa, wv_volinfo_fs_options, blkr_aggrsnap_blocks_scanned, wvblk_rsrv_holes, blkr_blocks_redirected_delta, wvblk_past_eof, blkr_rejected_segments_scanned, user_reads_hdd_rate, user_read_blocks_rate, wv_fsinfo_ssdblks_used, blkr_blocks_dummy_read_delta, delete_log, blkr_policy1_reject_reasons_labels, blkr_rejected_segments_before_scan_delta, user_reads, blkr_redirect_blocks_invalid_delta, blkr_redirect_ra_l1_delta, blkr_csc_full_aa_delta, cp_reads, blkr_empty_segments_scanned, wvblk_lev0_over_nominal, process_name, blkr_rejected_blocks_scanned, ext_cache_ilog_full, wv_fsinfo_blks_blks_rsrv_holes, blkr_redirect_blocks_updated, wv_fsinfo_containment_version_highest_spare2, wv_fsinfo_containment_version_highest_spare1, blkr_blocks_redirected_maybe_delta, blkr_redirect_indirects_updated_labels, blkr_blocks_redirected, cp_read_blocks_rate, delete_log_labels, user_writes_hdd, user_write_blocks_ssd, blkr_async_offline_delta, blkr_blocks_read_delta, blkr_csc_aa_requested, blkr_async_no_mem, blkr_blocks_scanned, wv_fsinfo_blks_overwrite_slider_pct, user_reads_rate, blkr_aggrsnap_blocks_scanned_delta, blkr_redirect_ra_l1, blkr_redirect_ra_l0, wvblk_snap_reserve, blkr_redirect_blocks_ok, blkr_redirect_indirects_inspected, wv_fsinfo_blks_snap_reserve_pct, user_write_blocks_rate, wv_fsinfo_blks_rsrv_absents, wv_fsinfo_containment_version_slc, blkr_blocks_redirected_noio, wv_fsinfo_containment_version_highest_compression, wv_fsinfo_blks_total, wvbd_owner_changed_y, wv_fsinfo_containment_version_sle, wvblk_saved_private_fsinfo_inos_reserve, user_write_blocks_ssd_rate, wv_fsinfo_private_inos_used, blkr_csc_total_aa_cleaned, cp_reads_ssd, blkr_blocks_redirected_noverify, blkr_redirect_demand_req, blkr_blocks_redirected_noread_delta, blkr_csc_buf_suspended_delta, user_read_blocks_ssd_rate, blkr_rejected_blocks_scanned_delta, cp_reads_ssd_rate, wvblk_delalloc, blkr_async_launched, blkr_csc_empty_aa_delta, blkr_non_csc_used_empty, blkr_segments_scanned, blkr_blocks_dummy_read, wv_fsinfo_blks_blks_rsrv_overwrite, instance_name, wvbd_whole_frees_o, user_reads_ssd_rate, cp_reads_hdd, wv_fsinfo_containment_version_highest_slc, wv_fsid, blkr_wa_used_non_csc_aa, wv_fsinfo_containment_version_highest_sle, blkr_super_blocks_scanned, wv_fsinfo_public_inos_used, blkr_async_completed_delta, blkr_reads_launched_delta, blkr_blocks_reallocated_delta, blkr_csc_msg_failed_delta, user_reads_ssd, blkr_rejected_segments_before_scan, blkr_csc_full_aa, blkr_redirect_indirects_ok_delta, blkr_policy1_reject_reasons, wvbd_whole_frees, blkr_redirect_kireetis_scanned_delta, user_read_blocks_hdd_rate, cp_read_blocks_ssd, blkr_policy1_reject_reasons_delta, wvblk_child_indirect_blk_cnt, blkr_redirect_indirects_ok_labels, node_name, blkr_csc_total_aa_cleaned_delta, blkr_non_csc_used_full_delta, wv_fsinfo_blks_used, wv_fsinfo_ssdblks_total, wv_fsinfo_fs_version, disk_type, blkr_redirect_demand_rereq_delta, wv_fsinfo_public_inos_total, user_write_blocks_hdd, cp_read_blocks, blkr_rejected_segments_scanned_delta, blkr_redirect_ra_l0_delta, cp_read_blocks_ssd_rate, wv_volinfo_fs_flags, blkr_blocks_redirected_noverify_delta, blkr_blocks_redirected_maybe, parent_host, wvblk_rsrv_holes64, wvblk_rsrv_child_overwrite, blkr_csc_aa_requested_delta, wvip_public_inofile_wi_blk_cnt, blkr_blocks_postfiltered_delta, blkr_blocks_postfiltered_labels, wv_fsinfo_blks_blks_rsrv_holes_cifs, wvblk_space_tax, blkr_async_launched_delta, blkr_csc_aa_inventory, blkr_wa_used_non_csc_aa_delta, wvblk_saved_private_fsinfo_inos_used, blkr_async_completed, wv_fsinfo_private_inos_reserve, blkr_blocks_reallocated, blkr_async_no_msg, blkr_blocks_redirected_nomem_delta, wvbd_active_frees, blkr_blocks_redirected_nomem, wv_fsinfo_blks_reserve, user_reads_hdd, wv_fsinfo_ssdblks_used_to_write_cache, blkr_free_blocks_scanned, blkr_reads_launched, blkr_redirect_indirects_inspected_delta, blkr_blocks_postfiltered, blkr_csc_buf suspended, blkr_aa_blocks_scanned_delta, blkr_blocks_overwritten, blkr_csc_msg_completed, total_transfers_hdd_rate, blkr_async_offline, blkr_super_blocks_scanned_delta, wvbd_active_frees_y, blkr_redirect_demand_req_delta, blkr_csc_msg_completed_delta, blkr_csc_msg_failed, user_writes_ssd_rate, blkr_rejected_ssd_rgs, blkr_redirect_kireetis_scanned, blkr_redirect_indirects_ok, wv_fsinfo_public_inos_reserve, blkr_blocks_redirected_no11, wvblk_zombie_blks, blkr_blocks_redirected_reread, user_read_blocks_hdd, blkr_redirect_ra_map_delta, wvip_private_inofile_wi_blk_cnt, wvblk_past_eof64, blkr_blocks_read, blkr_redirect_susps, wvblk_rsrv_holes_cifs, blkr_redirect_indirects_updated_delta, wv_vol_type, wv_fsinfo_blks64_blks_rsrv_holes, wvzmb_num_zmsgs_inuse, wvblk_saved_public_fsinfo_inos_reserve, cp_read_blocks_hdd_rate, blkr_async_no_mem_delta, blkr_blocks_overwritten_delta, wvblk_rsrv_holes_cifs64, blkr_rejected_ssd_rgs_delta, total_transfers_ssd_rate, wv_fsinfo_ssdblks_used_by_plane0, instance_uuid, blkr_redirect_indirects_updated, user_read_blocks_ssd, user_write_blocks, blkr_full_segments_scanned, wvblk_rsrv_child_overwrite_always, blkr_blocks_scanned_delta, blkr_non_csc_used_full, user_writes, blkr_blocks_redirected_noread, user_writes_ssd, blkr_redirect_demand_drop_delta, node_uuid, wvblk_saved_public_fsinfo_inos_total, wv_fsinfo_blks_res_state, wv_fsinfo_private_inos_total, blkr_redirect_demand_drop, blkr_rejected_segments_in_current_aa, wvblk_child_to_be_reclaimed, user_writes_rate, blkr_redirect_ra_map, wv_fsinfo_blks_used_by_plane0, cp_read_blocks_hdd, blkr_redirect_blocks_invalid, blkr_redirect_blocks_updated_delta, user_writes_hdd_rate, blkr_redirect_susps_delta, blkr_empty_segments_scanned_delta, blkr_aa_blocks_scanned, total_transfers_ssd, wv_fsinfo_blkr_cp, user_read_blocks, wv_fsinfo_blks64_blks_rsrv_holes_cifs.

DISK PERF METRICS: disk_busy_percent, node_name, cp_reads_rate, user_write_chain, user_read_latency_average, user_reads_rate, total_transfers_rate, user_read_chain_average, guarenteed_write_chain, user_read_blocks_rate, raid_group, skip_blocks_rate, cp_read_chain_average, guarenteed_read_blocks, cp_read_blocks, guarenteed_write_latency_average, disk_io_latency_histogram, guarenteed_read_blocks_rate, raid_type, io_pending, guarenteed_write_latency, guarenteed_write_blocks, user_writes_in_skip_mask_rate, dlsched_distant, cp_read_latency, total_transfers, io_queued_average, user_write_latency_average, disk_capacity, user_read_chain, instance_uuid, raid_group_id, user_read_latency, user_write_blocks, dlsched_max_distant, dlsched_immediate, disk_busy, user_skip_write_ios_rate, dlsched_count_rate, guarenteed_read_chain, user_writes_in_skip_mask, user_writes, display_name, guarenteed_read_chain_average, io_pending_average, user_write_latency, guarenteed_reads_rate, node_uuid, guarenteed_write_chain_average, dlsched_max_background, dlsched_count, cp_read_chain, guarenteed_write_blocks_rate, user_reads, guarenteed_reads, skip_blocks, instance_name, disk_io_latency_histogram_labels, cp_reads, user_writes_rate, process_name, guarenteed_writes, dlsched_wait_average, user_write_chain_average, raid_name, base_for_disk_busy, guarenteed_writes_rate, user_write_blocks_rate, dlsched_wait, disk_io_latency_histogram_delta, cp_read_latency_average, cp_read_blocks_rate, user_skip_write_ios, disk_speed, guarenteed_read_latency, dlsched_io_time, io_queued, user_read_blocks, guarenteed_read_latency_average, objtype.

LUN PERF METRICS: read_data_rate, read_align_histo, write_ops, write_data, scsi_partner_data_rate, avg_other_latency, write_partial_blocks, queue_full, display_name, avg_other_latency_average, total_ops_rate, read_data, read_ops_rate, scsi_partner_ops, write_align_histo, avg_write_latency_average, scsi_partner_ops_rate, read_partial_blocks_percent, read_ops1, write_align_histo_labels, read_align_histo_labels, read_ops, avg_write_latency, avg_read_latency_average, total_ops, queue_full_rate, read_align_histo_percent, write_align_histo_percent, read_partial_blocks, write_ops1, queue_depth_lun, other_ops, write_partial_blocks_percent, avg_latency, write_data_rate, write_ops_rate, avg_read_latency, avg_latency_average, other_ops_rate, scsi_partner_data.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

3. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine customizable hard-wired logic, ASICs, or FPGAs with customizable programming to accomplish the techniques. The special-purpose computing devices may be desktop computer systems, portable computer systems, handheld devices, televisions, wearable computing devices, networking devices or any other device that incorporates hard-wired and/or program logic to implement the techniques.

Figure 6:
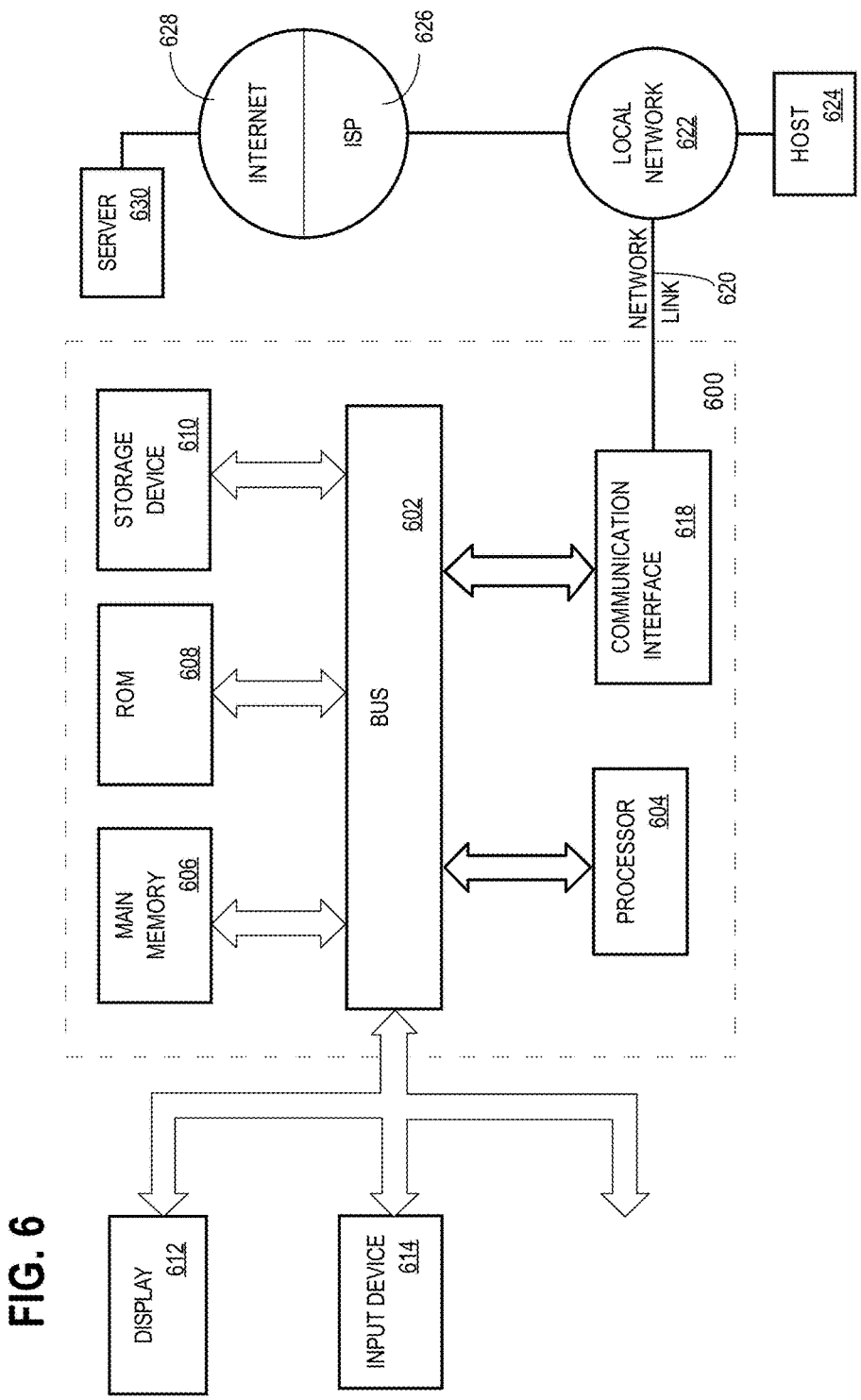
FIG. 6 is a block diagram that illustrates a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 6a, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In some embodiments, a customer interacts with computer system 600 via touch, for example, by tapping or gesturing over certain locations. A display screen of display 612 may also be capable of detecting touch.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

In drawings, various system components are depicted as being communicatively coupled to various other components by arrows. These arrows illustrate only certain examples of information flows between the components of the depicted systems. Neither the direction of the arrows nor the lack of arrow lines between certain components should be interpreted as indicating the absence of communication between the certain components. Indeed, each component of the depicted systems may feature an open port, API, or other suitable communication interface by which the component may become communicatively coupled to other components of the depicted systems as needed to accomplish any of the functions of the systems described herein.

What is claimed is:

1. A method, comprising:
    at one or more data management computers:
        obtaining, from a virtual system manager that manages one or more virtual machines, both (a) particular virtual machine data that relates to a particular virtual machine, and (b) an indication that the particular virtual machine uses a particular volume of data storage that contains data of the particular virtual machine and is managed by a storage controller that manages one or more storage units and that is separate from the virtual system manager;
        obtaining, from the storage controller, both (a) particular storage data that relates to the particular volume, and (b) an indication that the particular storage data relates to the particular volume;
        correlating the particular storage data to the particular virtual machine data based on both the indication that the particular virtual machine uses the particular volume and the indication that the particular storage data relates to the particular volume;
        determining performance information related to the particular volume that is based at least in part on an outcome of the correlating, the performance information including an indication that the particular volume that contains data of the particular virtual machine is a cause of a performance issue of the particular virtual machine based on information indicating a latency associated with the particular volume or a rate associated with the storage controller; and
        reconfiguring the particular virtual machine to use a volume of data storage other than the particular volume that is the cause of the performance issue of the particular virtual machine.

2. The method of claim 1, wherein the performance information includes information for use in generating a visualization of performance of the particular volume.

3. The method of claim 1, wherein the performance information includes information for use in generating a graph of a metric related to performance of the particular volume over time.

4. The method of claim 1, wherein the performance information includes a latency rate for a storage controller that manages the particular volume.

5. The method of claim 1, wherein the performance information includes information indicating an average latency of write operations for data stored by the particular volume.

6. The method of claim 1, wherein the performance information includes information indicating an average latency of read operations for data stored by the particular volume.

7. The method of claim 1, wherein the performance information includes information indicating an average number of input/output operations performed per second (IOPS) by the storage controller.

8. The method of claim 1, wherein the performance information includes an amount of space available in the particular volume.

9. The method of claim 1, wherein the performance information includes a percentage of the particular volume that is overprovisioned.

10. The method of claim 1, further comprising causing display, concurrently with a display of the performance information, of an amount of space provisioned in the particular volume for virtual machines.

11. The method of claim 1, further comprising causing display, concurrently with a display of the performance information, of a path of the particular volume.

12. The method of claim 1, further comprising causing display, concurrently with a display of the performance information, of a URL of the particular volume.

13. The method of claim 1, further comprising causing display, concurrently with a display of the performance information, of a number of virtual machines that use the particular volume.

14. The method of claim 1, further comprising causing display, concurrently with a display of the performance information, of names of one or more virtual machines that use the particular volume.

15. The method of claim 1, further comprising causing display, concurrently with a display of the performance information, of a name of a physical host of the particular virtual machine.

16. The method of claim 1, further comprising causing display, concurrently with a display of the performance information, of a name of the particular virtual machine.

17. The method of claim 1, further comprising causing display, concurrently with a display of the performance information, of an amount of space in the particular volume committed to the particular virtual machine.

18. The method of claim 1, further comprising causing display, concurrently with a display of the performance information, of an amount of uncommitted space in the particular volume for the particular virtual machine.

19. The method of claim 1, further comprising causing display, concurrently with a display of the performance information, of, an amount of space in the particular volume provisioned for the particular virtual machine.

20. The method of claim 1, wherein the particular volume is referenced by a volume name or an Internet Protocol (IP) address.

21. The method of claim 1, wherein the virtual system manager stores the particular virtual machine data in a data store separate from a data store in which the storage controller stores the particular storage data.

22. The method of claim 1, further comprising modifying the obtained particular storage data to conform to a particular format and storing the particular storage data in the particular format.

23. The method of claim 1 further comprising:
changing the state of a performance metric of the particular volume that is the cause of the performance issue of the particular virtual machine.

24. An apparatus comprising:
a subsystem, implemented at least partially in hardware, that obtains, from a virtual system manager that manages one or more virtual machines, both (a) particular virtual machine data that relates to a particular virtual machine, and (b) an indication that the particular virtual machine uses a particular volume of data storage that contains data of the particular virtual machine and is managed by a storage controller that manages one or more storage units and that is separate from the virtual system manager;
a subsystem, implemented at least partially in hardware, that obtains, from the storage controller, both (a) particular storage data that relates to the particular volume, and (b) an indication that the particular storage data relates to the particular volume;
a subsystem, implemented at least partially in hardware, that correlates the particular storage data to the particular virtual machine data based on both the indication that the particular virtual machine uses the particular volume and the indication that the particular storage data relates to the particular volume;
a subsystem, implemented at least partially in hardware, that determines performance information related to the particular volume that is based at least in part on an outcome of the correlating, the performance information including an indication that the particular volume that contains data of the particular virtual machine is a cause of a performance issue of the particular virtual machine based on information indicating a latency associated with the particular volume or a rate associated with the storage controller; and
a subsystem, implemented at least partially in hardware, that reconfigures the particular virtual machine to use a volume of data storage other than the particular volume that is the cause of the performance issue of the particular virtual machine.

25. The apparatus of claim 24, wherein the performance information includes information for use in generating a visualization of performance of the particular volume.

26. The apparatus of claim 24, wherein the performance information includes information for use in generating a graph of a metric related to performance of the particular volume over time.

27. The apparatus of claim 24, wherein the performance information includes a latency rate for a storage controller that manages the particular volume.

28. One or more non-transitory storage media storing instructions which, when executed by one or more computing devices, cause:
obtaining, from a virtual system manager that manages one or more virtual machines, both (a) particular virtual machine data that relates to a particular virtual machine, and (b) an indication that the particular virtual machine uses a particular volume of data storage that contains data of the particular virtual machine and is managed by a storage controller that manages one or more storage units and that is separate from the virtual system manager;
obtaining, from the storage controller, both (a) particular storage data that relates to the particular volume, and (b) an indication that the particular storage data relates to the particular volume;
correlating the particular storage data to the particular virtual machine data based on both the indication that the particular virtual machine uses the particular volume and the indication that the particular storage data relates to the particular volume;
determining performance information related to the particular volume that is based at least in part on an outcome of the correlating, the performance information including an indication that the particular volume that contains data of the particular virtual machine is a cause of a performance issue of the particular virtual machine based on information indicating a latency associated with the particular volume or a rate associated with the storage controller; and
reconfiguring the particular virtual machine to use a volume of data storage other than the particular volume that is the cause of the performance issue of the particular virtual machine.

29. The one or more non-transitory storage media of claim 28, wherein the performance information includes information for use in generating a visualization of performance of the particular volume.

30. The one or more non-transitory storage media of claim 28, wherein the performance information includes information for use in generating a graph of a metric related to performance of the particular volume over time.

31. The one or more non-transitory storage media of claim 28, wherein the performance information includes a latency rate for a storage controller that manages the particular volume.

* * * * *